United States Patent
Stoller et al.

(10) Patent No.: US 10,845,501 B2
(45) Date of Patent: Nov. 24, 2020

(54) CONTROL OF ELECTRICALLY OPERATED RADIATION GENERATORS

(71) Applicant: SCHLUMBERGER TECHNOLOGY CORPORATION, Sugar Land, TX (US)

(72) Inventors: Christian Stoller, Sugar Land, TX (US); Matthieu Simon, Clamart (FR); David Alan Rose, Sugar Land, TX (US); Libo Yang, Katy, TX (US); Onur Ozen, Clamart (FR); Sicco Beekman, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 270 days.

(21) Appl. No.: 15/346,242

(22) Filed: Nov. 8, 2016

(65) Prior Publication Data
US 2017/0139074 A1    May 18, 2017

Related U.S. Application Data

(60) Provisional application No. 62/254,664, filed on Nov. 12, 2015.

(51) Int. Cl.
*G01V 5/08*    (2006.01)
*E21B 49/00*   (2006.01)

(52) U.S. Cl.
CPC ............. *G01V 5/08* (2013.01); *E21B 49/00* (2013.01)

(58) Field of Classification Search
CPC .................... G01V 5/08; E21B 49/00
See application file for complete search history.

(56) References Cited

U.S. PATENT DOCUMENTS

| | | | |
|---|---|---|---|
| 3,147,378 A | 9/1964 | Hall, Jr. | |
| 3,461,291 A | 8/1969 | Goodman | |
| 5,154,078 A * | 10/1992 | Codazzi | E21B 47/107 |
| | | | 73/152.22 |
| 6,024,095 A * | 2/2000 | Stanley, III | A61B 18/04 |
| | | | 128/898 |
| 6,105,688 A | 8/2000 | Vaynshteyn et al. | |

(Continued)

OTHER PUBLICATIONS

Radtke et al., "A new capture and inelastic spectroscopy tool takes geochemical logging to the next level", SPWLA 53rd Annual Logging Symposium, Jun. 16-20, 2012, pp. 1-16.

*Primary Examiner* — David P Porta
*Assistant Examiner* — Djura Malevic
(74) *Attorney, Agent, or Firm* — Trevor G. Grove

(57) ABSTRACT

The present disclosure describes a downhole tool including an electrically operated radiation generator that selectively output radiation to a surrounding environment based at least in part on supply of electrical power; and a control system that determines likelihood of exposing living beings in the surrounding environment to output radiation by determining whether one or more check conditions is met; determine that each of the one or more check conditions is met before instructing the electrically operated radiation generator to output radiation; and instruct the electrically operated radiation generator to cease output of radiation when at least one of the one or more check conditions is no longer met.

17 Claims, 9 Drawing Sheets

(56) References Cited

U.S. PATENT DOCUMENTS

| | | | |
|---|---|---|---|
| 6,234,250 B1 * | 5/2001 | Green | E21B 47/003 166/250.03 |
| 6,298,924 B1 | 10/2001 | Vaynshteyn et al. | |
| 6,649,906 B2 * | 11/2003 | Adolph | G01V 5/101 250/269.1 |
| 6,820,702 B2 * | 11/2004 | Niedermayr | E21B 21/08 175/57 |
| 8,346,481 B2 | 1/2013 | Jacobson et al. | |
| 8,944,162 B2 | 2/2015 | Dorffer et al. | |
| 8,996,315 B2 | 3/2015 | Guo et al. | |
| 9,261,612 B2 * | 2/2016 | Inanc | G01T 7/005 |
| 9,696,455 B2 * | 7/2017 | Radtke | G01V 5/104 |
| 2002/0038849 A1 * | 4/2002 | Adolph | G01V 5/101 250/269.1 |
| 2003/0063013 A1 * | 4/2003 | Jin | E21B 44/00 340/853.3 |
| 2007/0151762 A1 * | 7/2007 | Reitsma | E21B 21/08 175/40 |
| 2013/0087388 A1 * | 4/2013 | Veeningen | E21B 47/06 175/48 |
| 2013/0168100 A1 * | 7/2013 | Judge | E21B 21/08 166/336 |
| 2013/0325351 A1 * | 12/2013 | Haberer | E21B 47/10 702/12 |
| 2014/0214325 A1 * | 7/2014 | Wessling | E21B 47/06 702/11 |
| 2014/0265565 A1 * | 9/2014 | Cooley | H02P 6/18 307/18 |
| 2015/0041633 A1 | 2/2015 | Guo et al. | |
| 2016/0061991 A1 | 3/2016 | Berkcan et al. | |
| 2016/0084076 A1 * | 3/2016 | Fanini | E21B 47/12 340/853.1 |
| 2016/0369581 A1 * | 12/2016 | Dugas | E21B 47/06 |
| 2017/0139075 A1 | 5/2017 | Radtke et al. | |
| 2019/0240770 A1 * | 8/2019 | Faircloth | B23K 26/0626 |

\* cited by examiner

CONTROL OF ELECTRICALLY OPERATED RADIATION GENERATORS

This application claims priority to U.S. Provisional Application No. 62/254,664, filed on Nov. 12, 2015, the entirety of which is incorporated herein by reference.

BACKGROUND

The present disclosure relates generally to electrically operated radiation generators and, more particularly, to controlling operation of the electrically operate radiation generators.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, an electrically operated radiation generator, such as an x-ray generator, a gamma ray generator, or a neutron generator, may generate radiation using electrical power on-demand to facilitate determining characteristics of its surrounding environment. Thus, electrically operated radiation generators may be used in various contexts, such as a downhole tool or for material analysis. For example, in a downhole tool, an electrically operated radiation generator may facilitate determining porosity of surrounding formations based at least in part on count (e.g., number of neutrons or gamma-rays) of radiation and/or mineralogy of surrounding formations based at least in part on spectrum of radiation measured by a detector (e.g., scintillator).

To facilitate determining the characteristics, the electrically operated radiation generator may output high energy radiation into its surrounding environment. Once output, the high energy radiation may interact with atoms in the surroundings, for example, transferring energy to an atom and/or causing the atom to release one of its neutrons. As such, the electrically operated radiation generator may be operated to reduce likelihood of emitting radiation when not properly insulated from living beings, such as an operator.

BRIEF DESCRIPTION OF THE DRAWINGS

Various aspects of this disclosure may be better understood upon reading the following detailed description and upon reference to the drawings in which.

DETAILED DESCRIPTION

Figure 1:
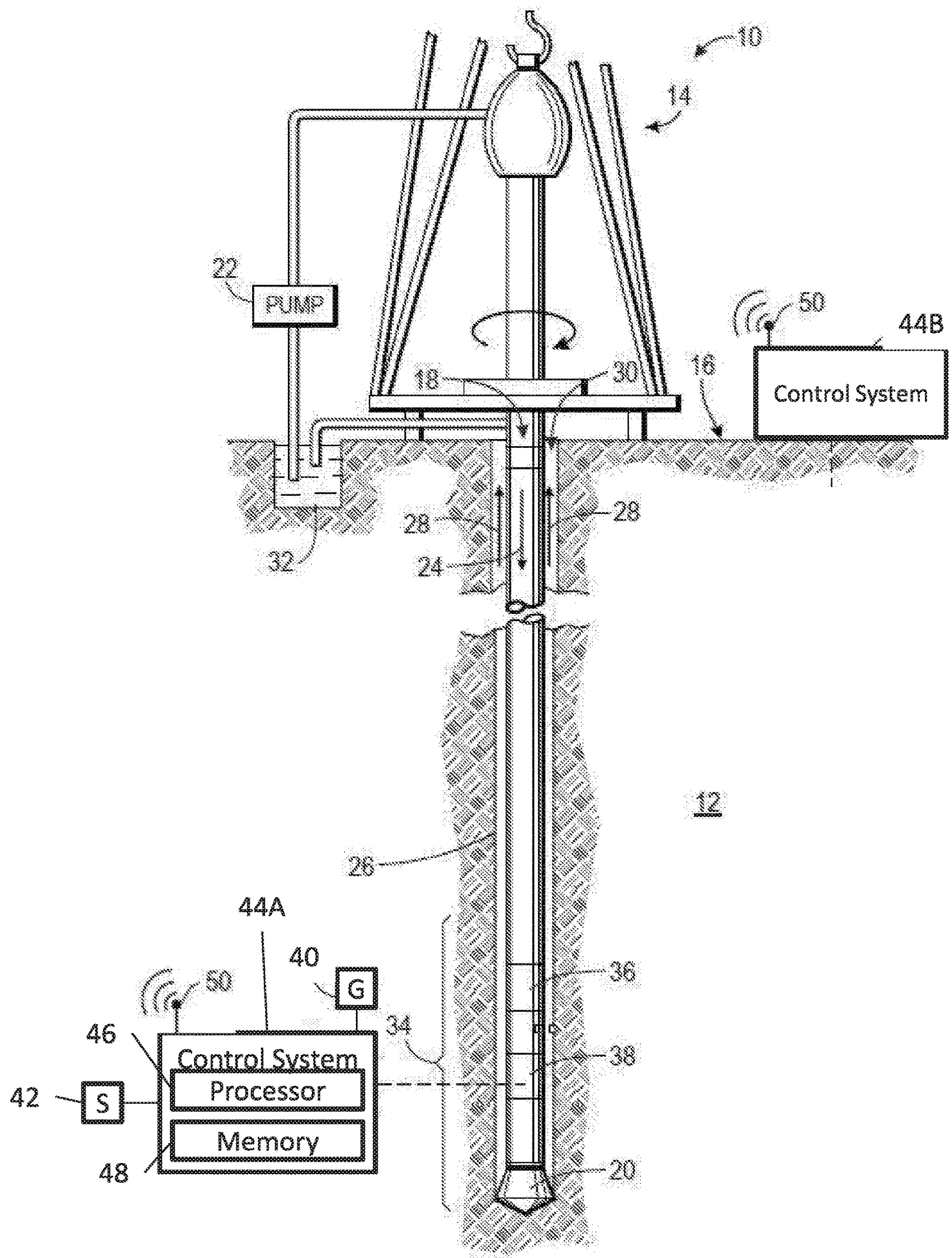
FIG. 1 is a schematic diagram of a drilling system including a downhole tool with an electrically operated radiation generator, in accordance with an embodiment.

One or more specific embodiments of the present disclosure will be described below. These described embodiments are examples of the presently disclosed techniques. Additionally, in an effort to provide a concise description of these embodiments, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, an electrically operated radiation generator may generate and output radiation to facilitate determining characteristics (e.g., porosity and/or mineralogy) of its surrounding environment. Depending on characteristics to determine, various types of electrically operated radiation generators may be used, such as x-ray generators, gamma ray generators, or neutron generators. Generally, the different types of electrically operated radiation generators may output different types of radiation. For example, an x-ray generator may output x-ray radiation, a gamma ray generator may output gamma ray radiation, and a neutron generator may output neutron radiation.

Nevertheless, the different types of electrically operated radiation generators may be operationally similar in certain aspects. For example, electrical power may be supplied to accelerate a particle (e.g., ion or electron) toward a target. When the particle strikes atoms in the target, radiation may be generated and output. The radiation may then interact with atoms in the surrounding environment, for example, causing the atoms in the surrounding environment to output radiation (e.g., neutrons and/or gamma rays). A detector (e.g., sensor) may then measure count (e.g., amount), count rate (e.g., amount per unit time), and/or other properties of the radiation returned from the surrounding environment. Based at least in part on such measured properties, characteristics of the surrounding environment, such as porosity and/or mineralogy, may be determined.

To cause the atoms in the surrounding environment to output radiation, the electrically operated radiation generator may output radiation at high energies. For example, a pulsed neutron generator may output neutrons between about two to fourteen megaelectron-volts. Due to this high energy, it may be desirable to operate the electrically operated radiation generator in some environments and not others. For example, it may be desirable to output radiation from an electrically operated radiation generator when living beings are properly shielded from the radiation (e.g., downhole or on surface with radiation barrier) and undesirable to output radiation when living beings are not properly shield from the radiation (e.g., on the surface with open radiation barrier).

Accordingly, as will be described in more detail below, the present disclosure provides techniques to control operation of an electrically operated radiation generator both sub-surface (e.g., downhole) and on the surface based on check conditions to reduce likelihood of outputting radiation when undesirable. In some embodiments, a control system may control operation of an electrically operated radiation generator based on check conditions that provide an indication of the surrounding environment and/or when radiation output is desired. In such embodiments, the control system may automatically determine whether check conditions are met before instructing the electrically operated radiation generator to output radiation and instruct the electrically operated radiation generator to stop outputting radiation when check conditions are no longer met.

As described above, an electrically operated radiation generator may be deployed sub-surface (e.g., downhole) in a downhole tool. Specifically, the electrically operated radiation generator may output high energy radiation to facilitate determining characteristics of surrounding sub-surface formations. As described above, the high energy radiation may interact with atoms in the sub-surface formation. In some instances, the sub-surface formation may be sufficient to shield living beings at the surface from high energy radiation. Thus, the control system may control operation of the electrically operated radiation generator such that high energy radiation is output when operation is authorized, determination of sub-surface formation characteristics is desired, and the sub-surface formation is sufficient to shield living beings at the surface.

In some embodiments, communication between the surface (e.g., an operator) and the downhole tool when deployed may be limited. For example, in a slickline system, information may be communicated from the surface to the downhole tool using stimuli sequences (e.g., tension pulses), but communication of information from the downhole tool to the surface may be limited. In other words, the surface may be able to communicate information to the downhole, but the downhole tool may be unable to communicate information to the surface.

Accordingly, in some embodiments, the control system may be divided between a surface control system (e.g., operator) and a downhole control system to facilitate controlling operation of the electrically operated radiation generator with reduced communication between the surface and the downhole tool. In such embodiments, the surface control system may communicate information (e.g., control commands, timing parameters, threshold values and/or a password) to the downhole control system and the downhole control system may relatively independently control operation of the electrically operated based on the received information.

To facilitate, the downhole control system may use check conditions to determine when output of high energy radiation is desirable based on factors, such as whether operation is authorized, determination of sub-surface characteristics is desired, and the sub-surface formation is sufficient to shield living beings at the surface. In some embodiments, the check conditions may include a password verification condition, a temperature threshold condition, a pressure threshold condition, a battery voltage threshold condition, a start time condition, a stop time condition, an operating duration condition, a start command condition, a stop command condition, and an interlock key verification condition.

For example, in such embodiments, the downhole control system may transition the electrically operated radiation generator from a standby state to a ready state when the password verification condition is met, the start time condition is set, the stop time condition is set, the operating duration condition is set, and the battery voltage threshold condition is met. As used herein, the "standby state" is intended to describe when the electrically operated radiation generator is power off and each of the check conditions has not yet been set. Additionally, as used herein, the "ready state" is intended to describe when the electrically operated radiation generator is power off and each of the check conditions has been set, but not yet verified. In some embodiments, the downhole control system may determine that the password verification condition is met when an input password is verified as associated with an authorized user and the battery voltage threshold condition is met when voltage of a battery is greater than a battery voltage threshold.

Additionally, in such embodiments, the control system may transition the electrically operated radiation generator from the ready state to an output state when the start time condition, the start command condition, the stop time condition, the battery voltage condition, the interlock key verification condition, the password verification condition, the temperature threshold condition, and the pressure threshold condition are met. As used herein, the "output state" is intended to describe when electrical power is supplied and radiation is output from the electrically operated radiation generator 40. In some embodiments, the control system may determine that the start time condition is met when a clock value is greater than a start time parameter, the stop time condition is met when the clock value is not greater than a stop time parameter, the start command condition is met when a start command is received, the battery voltage threshold condition is met when voltage of the battery is greater than the battery voltage threshold, the password condition is met when the verified password has not been canceled, the stop command condition has been met when a stop command has not been received, the pressure threshold condition is met when a measured pressure is greater than a pressure threshold, the temperature threshold condition is met when a measured temperature is greater than a temperature threshold, and the interlock key verification condition is met when an authorized interlock key is connected.

Furthermore, in such embodiments, the control system may transition the electrically operated radiation generator form the output state back to the standby state when the stop time condition, the operating duration condition, the battery voltage threshold condition, the password verification condition, the stop command condition, the interlock key verification condition, the pressure threshold condition, or the temperature threshold condition is no longer met. In some embodiments, the control system may determine that the stop time condition is no longer met when a clock value is not less that the stop time parameter, the battery voltage threshold condition is no longer met when voltage of the battery is not greater than the battery voltage threshold, the password condition is no longer met when the verified password has been canceled, the stop command condition is no longer met when a stop command has been received, the pressure threshold condition is no longer met when the measured pressure is not greater than the pressure threshold, the temperature threshold condition is no longer met when the measured temperature is not greater than the temperature threshold, and the interlock key verification condition is no longer met when the authorized interlock key is disconnected.

In this manner, the downhole control system may relatively independently control operation of the electrically operated radiation generator, which may facilitate reducing communication between the downhole control system and the surface control system. In fact, this may be particularly useful when communication capabilities between the downhole control system and the surface control system are limited or non-existent, for example, in a slickline system.

As described above, the present disclosure also provides techniques for controlling operation of an electrically operated generator when operated on the surface. In some instances, an electrically operated radiation generator may be operated on the surface, for example, during testing and/or calibration. When operated on the surface, surrounding formations may no longer be present. Accordingly, a radiation barrier may be placed around the perimeter of the electrically operated radiation generator to reduce likelihood of exposing outside living beings to high energy radiation. Thus, the control system may consider different factors when operating on the surface compared to operating downhole.

To facilitate managing the different factors, the control system may use a surface operation tool when operating an electrically operated radiation generator on the surface. In some embodiments, the surface operation tool may include visual and/or audio indicators to provide indications of operational parameters (e.g., operating state, radiation metric, and/or threshold values) of the electrically operated radiation generator. Additionally, in some embodiments, the surface operation tool may include input devices (e.g., buttons) to enable communication with the electrically operated radiation generator form the surface operation tool.

Additionally, to facilitate, the control system may use may use check conditions to determine when to output of high energy radiation is desirable based on factors such as, whether operation is authorized, radiation output is desired (e.g., for testing and/or calibration), and the radiation barrier is sufficient to outside shield living beings. In some embodiments, the check conditions may include a surface operation tool verification condition, a hardware key verification condition, a barrier interlock condition, an arm button condition, a radiation metric threshold condition, and an emergency stop (E-stop) button condition.

For example, in such embodiments, the control system may transition the electrically operated radiation generator from the standby state to the ready state when the surface operation tool verification condition, the hardware key verification condition, and the barrier interlock condition are met. In some embodiments, the control system may determine that the surface operation tool verification condition is met when the surface operation tool is communicatively coupled between the control system and the electrically operated radiation generator and a self-check has verified proper operation of the surface operation tool. Additionally, in some embodiments, the control system may determine that the hardware key verification condition is met when an inserted hardware is verified as associated with an authorized user and the barrier interlock condition is met when a barrier interlock at an opening in the radiation barrier is connected.

Additionally, in such embodiments, the control system may transition the electrically operated radiation from the ready state to the output state when the arm button condition is met. In some embodiments, the surface operation tool may transmit a start command to the electrically operated radiation generator when an arm button is actuated. Thus, the control system may determine that the arm button condition is met when the arm button is actuated and/or a start command is transmitted to the electrically operated radiation generator.

Furthermore, in such embodiments, the control system may transition the electrically operated radiation generator from the output state back to the standby state when the radiation metric threshold condition, the barrier interlock condition, and the e-stop button condition are no longer met. In some embodiments, the surface operation tool may transmit a stop command to the electrically operated radiation generator when an arm button is actuated. Thus, the control system may determine that the radiation metric threshold condition is no longer met when a resulting radiation metric is not less than a radiation metric threshold, the interlock barrier condition is no longer met when the barrier interlock is disconnected, and the emergency stop button condition is no longer met when an emergency stop button is actuated and/or a stop command is transmitted to the electrically operated radiation generator. In this manner, the control system may use the surface operation tool to facilitate controlling operation of the electrically operated radiation generator on the surface.

Electrically Operated Radiation Generators

Since useful for determining characteristics of its surrounding environment, electrically operated radiation generators may be used in various contexts, such as resource (e.g., oil and/or gas) exploration contexts or material analysis contexts. For example, in resource exploration, an electrically operated radiation generator may be included in a downhole tool to determine characteristics of surrounding sub-surface formations, such as porosity and/or mineralogy. To simplify discussion, the present disclosure will be described with regard to a downhole tool. However, one of ordinary skill in the art should appreciate that the techniques described herein may be applied to use of electrically operated radiation generators in other contexts.

Even within downhole tools, the implementation of electrically operated radiation generators may vary. To help illustrate, FIG. 1 describes use in a drilling system 10, which may be used to drill a well through sub-surface formations 12. In the depicted embodiment, a drilling rig 14 at the surface 16 may rotate a drill string 18, which includes a drill bit 20 at its lower end to engage the sub-surface formations 12. To cool and/or lubricate the drill bit 20, a drilling fluid pump 22 may pump drilling fluid, commonly referred to as "mud" or "drilling mud," downward through the center of the drill string 18 in the direction of the arrow 24 to the drill bit 20. At the drill bit 20, the drilling fluid may then exit the drill string 18 through ports (not shown). The drilling fluid may then flow in the direction of the arrows 28 through an annulus 30 between the drill string 18 and the formation 12 toward the surface 16. In this manner, the drilling fluid may carry drill cuttings away from the bottom of a borehole 26. Once at the surface 16, the returned drilling fluid may be filtered and conveyed back to a mud pit 32 for reuse.

Additionally, as depicted, the lower end of the drill string 18 includes a bottom-hole assembly 34 that includes the drill bit 20 along with various downhole tools, such as a measuring-while-drilling (MWD) tool 36 and a logging-while-drilling (LWD) tool 38. Generally, the downhole tools (e.g., MWD tool 36 and LWD tool 38) may facilitate determining characteristics of the surrounding formation 12. Thus, in some embodiments, the LWD tool 38 may include an electrically operated radiation generator 40, which outputs radiation into the surrounding formation 12, and one or more sensors 42, which may measure radiation returned from the surrounding formation 12, surrounding pressure, and/or surrounding temperature.

In some embodiments, a control system 44 may control operation of the LWD tool 38. For example, the control system 44 may instruct the electrically operated radiation generator 40 when to output radiation, instruct the electrically operated radiation generator 40 when to cease outputting radiation, receive measurements from the sensors 42, and/or process the measurements to determine characteristics of the surrounding environment (e.g., formation 12). In some embodiments, the control system 44 may be included in the bottom-hole assembly 34. In other embodiments, the control system 44 may be separate from the bottom-hole assembly 34, for example, at the surface 16. In other embodiments, a portion of the control system 44 may be included in the bottom-hole assembly 34 and another portion may be located separate from the bottom-hole assembly 34. For example, the control system 44 may be divided between a downhole control system 44A located in the bottom-hole assembly 34 and a surface control system 44B located at the surface 16.

When at least a portion is separate from the LWD tool 38, information (e.g., measurements and/or determined characteristics) may be transmitted to and/or within the control system 44 for further processing, for example, via mud pulse telemetry system (not shown) and/or a wireless communication system. Accordingly, in some embodiments, the LWD tool 38 and/or the control system 40 may include wireless transceivers 50 to facilitate communicating information.

To facilitate controlling operation, the control system 44 may include one or more processors 46 and one or more memory 48. In some embodiments, the processor 46 may include one or more general purpose microprocessors, one or more application specific processors (ASICs), one or more field programmable logic arrays (FPGAs), or any combination thereof. Additionally, the memory 48 may be a tangible, non-transitory, computer-readable medium that stores instructions executable by and data to be processed by the processor 46. Thus, in some embodiments, the memory 48 may include random access memory (RAM), read only memory (ROM), rewritable flash memory, hard drives, optical discs, and the like.

Figure 2:
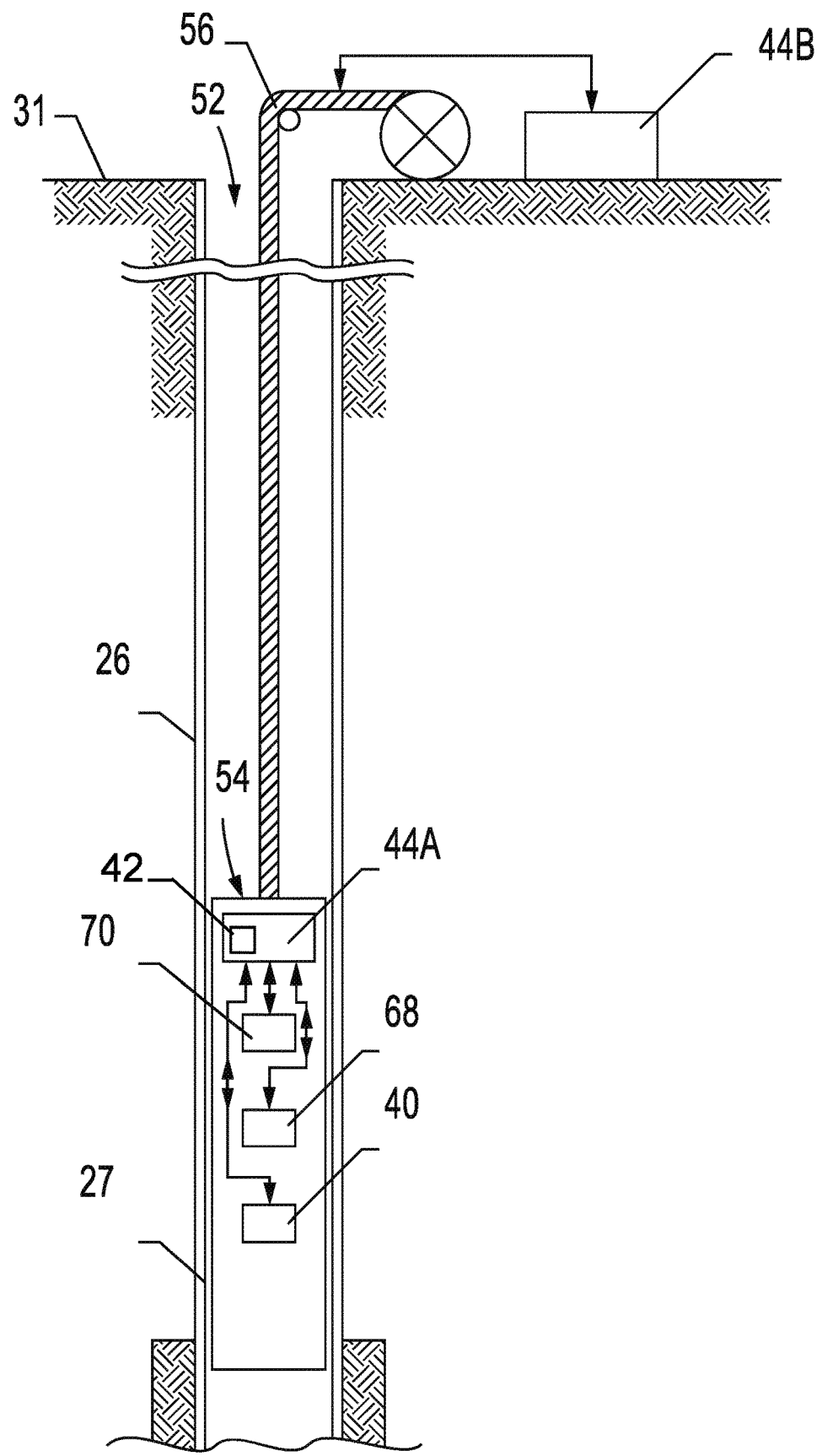
FIG. 2 is a schematic diagram of a conveyance line system including a downhole tool with an electrically operated radiation generator, in accordance with an embodiment.

In addition to the drilling system 10, an electrically operated radiation generator 40 may be used in a conveyance line system 52, as described in FIG. 2. In the depicted embodiment, the conveyance line system 52 includes a conveyance line assembly 54 suspended in the borehole via a cable 56. In some embodiments, the conveyance line system 52 may be a wireline system when the cable 56 is an armored electrical cable that enables bi-directional communication between the conveyance line assembly 54 (e.g., the downhole control system 44A) and the surface control system 44B.

In other embodiments, the conveyance line system 52 may be a slickline system when the cable 56 is used to support the conveyance line assembly 54, but does not provide direct communication between the conveyance line assembly 54 (e.g., downhole control system 44A) and the surface control system 44B. In such embodiments, the surface control system 44B may communicate with the conveyance line assembly 54 using physical stimuli. For example, information (e.g., control commands and/or operational parameters) may be communicated to the conveyance line assembly 54 using tension pulses on the cable 56. An accelerometer located in the conveyance line assembly 54 may then detect and interpret the tension pulls to enable communication of information from the surface control system 44B to the conveyance line assembly 54.

In other embodiments, casing collar locators may be positioned in the borehole. Thus, when the downhole tool 62 is moved up or down a sensor 42 in the conveyance line assembly 54 may detect signals from the surface control system 44B. Additionally, when the downhole tool is in a riser, the riser may enable acoustic communications from the surface control system 44B to the downhole control system 44A. Furthermore, in some embodiments, a magnetic and/or electric dipole coupling mechanism may provide a bidirectional wireless communication channel between the surface control system 44B and the downhole control system 44A.

Besides the radiation generator 40, the conveyance line assembly 54 may further contain one or more gamma ray detectors 68 and/or one or more neutron detectors 70, each disposed at a different axial spacing from the radiation generator 40. The radiation generator 40 can be an electrically operated pulsed neutron generator (PNG) to emit neutron radiations. Shielding (not shown) may be applied between the radiation generator 40 and the detectors 68, 70 to reduce direct transmission of neutrons from the radiation generator 40 to the detectors 68, 70. Thus, detected radiation may be characterized at each of a plurality of distances from the radiation generator 40, and thus have different lateral response (depth of investigation) into the formations surrounding the borehole 26. In some examples, two or more different types of well logging instrument, each having a different type of source and different types of corresponding detectors may be included in the same instrument assembly of "tool string."

The instrument 54 maybe coupled to an armored electrical cable 56 that may be extended into and retracted from the borehole 26. The borehole 26 may or may not include metal pipe or casing 27 therein. The cable 56 conducts electrical power to operate the instrument 54 from a surface 31 deployed the surface control system 44B. Signals from the detectors 68, 70 may be processed by the downhole control system 44A for transmission along the cable 56 to the surface control system 44B for recording and/or further processing. Each of the downhole control system 44A and the surface control system 44B may include a processor, a memory and/or a computer system as explained herein.

Although described in relation to a drilling system 10 and a conveyance line system 52, electrically operated radiation generators 40 may also be used in other implementations of downhole tools. For example, an electrically operated radiation generator 40 may be used in a coiled tubing system, a wired drill pipe system, or the like. Although implementation may vary, operation of an electrically operated radiation generator 40 may be generally similar in certain aspects.

Figure 3:
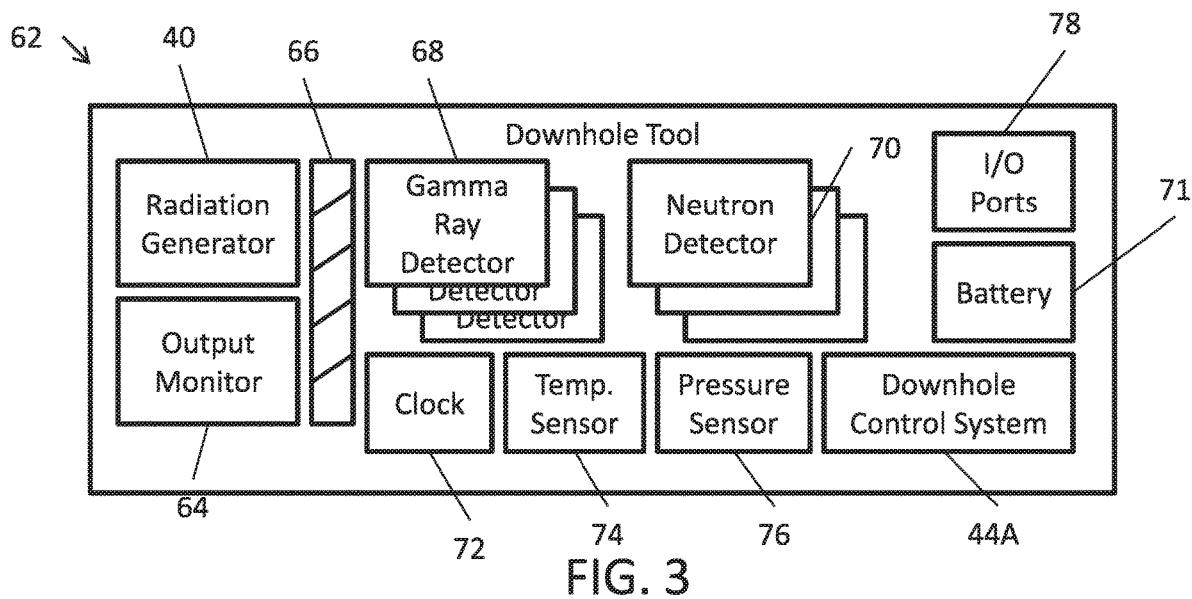
FIG. 3 is a block diagram of a downhole tool incorporating an electrically operated radiation generator, in accordance with an embodiment.

To help illustrate, one embodiment of a downhole tool 62 is described in FIG. 3. In the depicted embodiment, the downhole tool 62 includes an electrically operated radiation generator 40, an output radiation monitor 64, shielding 66, one or more gamma ray detectors (e.g., sensors) 68, and one or more neutron detectors (e.g., sensors) 70. As described above, the electrically operated radiation generator 40 may generate and output radiation, such as gamma rays or neutrons, into its surrounding environment. In some embodiments, characteristics of the surrounding environment may be determined based at least in part on amount and/or properties (e.g., energy) of radiation output and/or radiation received from the environment.

Accordingly, to facilitate determining the characteristics, the output radiation monitor 64 may monitor amount and/or properties of radiation output from the electrically operated radiation generator 40. Thus, in some embodiments, the output radiation monitor 64 may be a plastic scintillator and photomultiplier that primarily detects unscattered neutrons emitted from the electrically operated radiation generator 40. In such embodiments, the output radiation monitor 64 may facilitate determining a count (e.g., number of neutrons) and/or a count rate (e.g., number of neutrons per unit time) of radiation (e.g., fast neutrons) output from the electrically operated radiation generator 40.

As described above, characteristics may be determined based on interaction between output radiation and atoms in the surrounding environment. Neutrons emitted by the generator may interact with the surrounding materials in different ways. They may collide inelastically with a nucleus and as a result of the interaction the nucleus or nuclear reaction product may emit one or more gamma rays (so-called inelastic gamma rays). Output neutrons may collide elastically with nuclei in the surrounding materials and slow down to become an epithermal and eventually thermal neutrons. Slow neutrons may be captured by nuclei and the capture may be followed by the emission of one or more gamma rays (capture gamma rays). Generally, the radiation (e.g., neutrons and/or gamma rays) output from an atom may depend at least in part on properties (e.g., atomic number or atomic mass) of the atom. As such, resulting radiation may indicate type of materials in the surrounding formation 12.

Accordingly, to facilitate determining the characteristics, the downhole tool 62 may include one or more radiation detectors, such as one or more gamma ray detectors 68 and/or one or more neutron detectors 70. Since characteristics of the surrounding environment are determined based on radiation received from the surrounding environment, shielding 66 may be positioned between the electrically operated radiation generator 40 and the gamma ray detector 68/neutron detector 70 to reduce likelihood of radiation internally passing through the downhole tool 62.

Specifically, a gamma ray detector 68 may detect gamma rays (e.g., neutron capture gamma rays and/or inelastic gamma rays) that pass from the surrounding environment (e.g., formation 12) into the downhole tool 62. In some embodiments, the gamma ray detector 68 may be a scintillator detector that detects gamma rays by emitting light when a gamma ray interacts with the atoms of its crystal. Additionally, in some embodiments, the gamma ray detector 68 may be surrounded by neutron shielding to reduce likelihood of neutrons entering the gamma ray detector 68. In this manner, the gamma ray detector 68 may facilitate determining a count (e.g., magnitude of gamma rays) and/or a count rate (e.g., magnitude of gamma rays per unit time) of radiation received from its surrounding environment (e.g., formation 12).

Additionally, a neutron detector 70 may detect neutrons (e.g., epithermal and/or thermal neutrons) that pass from the surrounding environment (e.g., formation 12) into the downhole tool 62. In some embodiments, the neutron detector 70 may be a gas proportional detector that detects neutrons based on changes in proportion of gases caused by received neutrons. Additionally, in some embodiments, the neutron detector 70 may be surrounded by neutron shielding depending on type of neutrons to be detected. For example, an epithermal neutron detector may be surrounded by thermal neutron shielding to reduce likelihood of thermal neutrons entering the neutron detector 70. In this manner, the neutron detector 70 may facilitate determining a count (e.g. number of neutrons) and/or a count rate (e.g., number of neutrons per unit time) of radiation received from its surrounding environment (e.g., formation 12).

As described above, the downhole tool 62 may have limited external communication capabilities, for example, in a slickline system. In such embodiments, operation of the downhole tool 62 may be relatively self-contained. Accordingly, the downhole tool 62 may include a downhole control system 44A to relatively independently control operation of the electrically operated radiation generator 40 and a battery 71 to supply electrical power to the electrically operated radiation generator 40. As described above, the downhole control system 44A may control operation by instructing the electrically operated radiation generator 40 to output high energy radiation when formation 12 properties are desired and the surrounding formation 12 sufficiently shield living beings from the high energy radiation.

To facilitate this, as will be described in more detail below, the downhole tool 62 may include a clock 72 and one or more sensors 42 (e.g., a temperature sensor 74 and a pressure sensor 76) to directly measure characteristics of the surrounding environment. In some embodiments, the downhole control system 44A may use the clock 72 to monitor a start time, a stop time, and/or an operating duration of the electrically operated radiation generator 40. Additionally, the downhole control system 44A may use measurements from the one or more sensors 42 to determine expected location of the electrically operated radiation generator 40. For example, since pressure and temperature generally increase as depth increases, the downhole control system 44A may determine expected depth of the electrically operated radiation generator 40 based at least in part on pressure and temperature measurements.

Additionally, as described above, in some embodiments, the downhole tool 62 may be operated on the surface, for example, during testing and/or calibration. As will be described in more detail below, a surface operation tool may be communicatively coupled to the downhole tool when operated on the surface to facilitate reducing likelihood of exposing living beings to high energy radiation. Thus, in such embodiments, the downhole tool 62 may include input/output (I/O) ports 78 to communicatively couple the downhole tool 62 to external devices, such as a surface operation tool. For example, the input/output ports 78 may enable the surface operation tool to transmit control commands (e.g., start command and/or stop command) to the downhole tool 62 and the downhole tool 62 to transmit operational parameters (e.g., output radiation) to the surface operation tool.

As described above, various types of electrically operated radiation generators 40 may be used. However, the various types may be operationally similar in certain aspects. Specifically, the electrically operated radiation generator 40 may use electrical power to generate ions and/or electrons and to accelerate the ions and/or electrons toward a target. Upon striking the target, radiation may be output from the electrically operated radiation generator 40. To simplify discussion, the electrically operated radiation generator 40 will be described as a pulsed neutron generator (PNG). However, one of ordinary skill the art should recognize that the techniques described herein may be applied to other types of electrically operated radiation generators 40.

Figure 4:
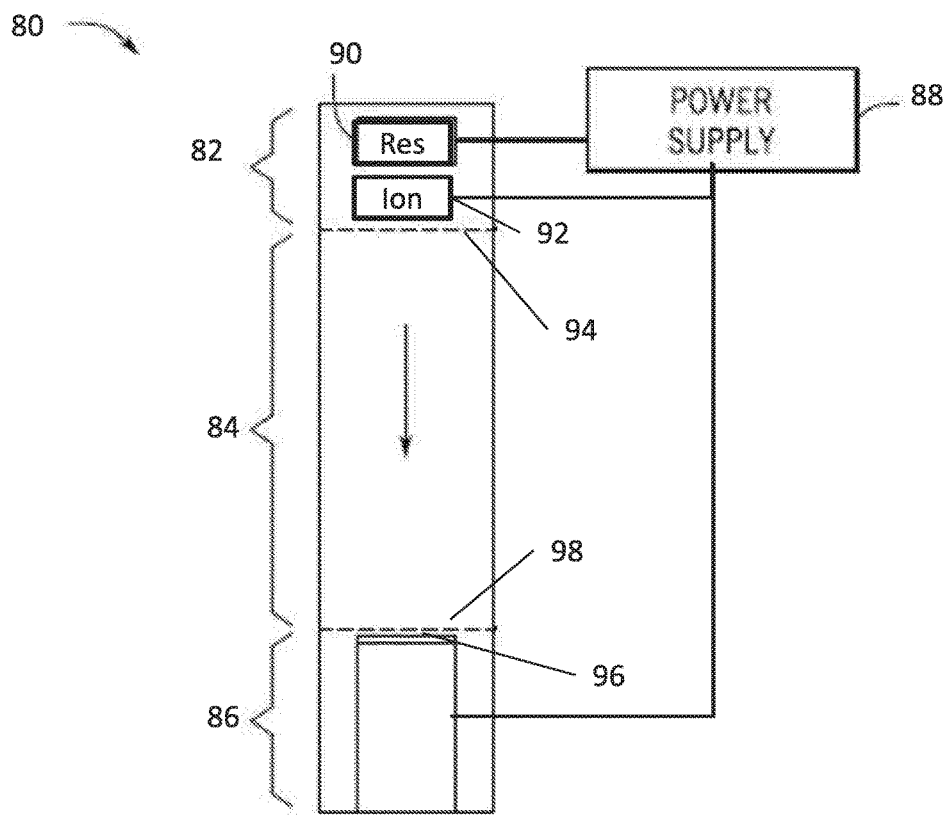
FIG. 4 is a schematic diagram of the electrically operated radiation generator of FIG. 3, in accordance with an embodiment.

One example of a pulsed neutron generator 80 is described in FIG. 4. Generally, a pulsed neutron generator 80 includes an ion source 82, an accelerating gap 84, a target 86, and one or more power supplies 88 (e.g., battery 71), which supplies electrical power to the ion source 82 and/or the target 86. In the depicted embodiment, the ion source 82 includes a gas reservoir 90, an ionizer 92, and an extractor electrode (e.g., grid) 94. Additionally, in the depicted embodiment, the target 86 includes a target film 96 and a suppressor electrode 98.

In operation, the gas reservoir 90 may generate hydrogen isotopes as gas. In some embodiments, when electrical power is supplied from the power supply 88, a filament may increase in temperature causing a getter containing hydrogen isotopes (e.g., deuterium and/or tritium) to release the hydrogen isotopes as gas. As gas is released, pressure in the gas reservoir 90 may increase causing the hydrogen isotope gas to flow into the ionizer 92.

The ionizer 92 may then ionize the hydrogen isotope gas received from the gas reservoir 90. In some embodiments, when electrical power is supplied from the power supply 88, a cathode may output electrons. Additionally, when electrical power is supplied from the power supply 88, an anode may generate an electrical field with the cathode causing the electrode to flow toward the anode. As the electrons are pulled toward the anode, the electrons may impact and excite the hydrogen isotopes, thereby generating positive hydrogen ions.

The extractor electrode 94 may then extract the hydrogen ions from the ion source 82 into the accelerating gap 84. In some embodiments, when electrical power is supplied from the power supply 88, the extractor electrode 94 may generate an electric field with the anode that guides the hydrogen ions toward the acceleration gap 84. The hydrogen ions may then be accelerated in the accelerating gap 84 toward the target 86. In some embodiments, when electrical power is supplied by the power supply 88, the suppressor electrode 98 may generate an electric field with the extractor electrode 94 that accelerates the hydrogen ions toward the target film 96.

In some embodiments, the target film 96 may be a thin film of titanium, scandium or other metal known to form hydrides. In one non-limiting example, the target layer 96 is a metal hydride such as titanium hydride containing therefore deuterium and/or tritium. As such, when the hydrogen ions collide with atoms in the target film 96, a fusion reaction that releases high energy neutrons (e.g., 14 MeV) may occur. In other words, the supply of electrical power may control extraction and acceleration of the hydrogen ions and, thus, output of radiation from the electrical operated radiation generator 40. In fact, in some embodiments, the power supply 88 may pulse the electrical power supplied to the extractor electrode 94 to generate bursts of neutron radiation. In this manner, the electrically operated radiation generator 40 may be operated to control when radiation (e.g., high energy neutrons) is output to its surroundings (e.g., formation 12).

Downhole Operation

As described above, the control system 44 may control operation of the electrically operated radiation generator 40 when operated downhole. In some embodiments, the control system 44 may be divided between a downhole control system 44A located in the downhole tool 62 and a surface control system 44B located at the surface 16. Additionally, in some embodiments, communication between the surface control system 44B and the downhole control system 44A may be limited when downhole. For example, in a slickline system, the surface control system 44B may be capable of communicating information to the downhole control system 44A (e.g., using tension pulses), but communication of information from the downhole control system 44A to the surface control system 44B may be limited or non-existent.

Thus, in such embodiments, the surface control system 44B may communicate information (e.g., control commands, passwords, timing parameters, and/or threshold values) to the downhole control system 44A and the downhole control system 44A may control operation of the electrically operated radiation generator 40 relatively independently based at least in part on the received information. For example, the surface control system 44B may communicate a start command to the downhole control system 44A.

However, due to the limited communication capabilities, the surface control system 44B may be unaware of the other factors (e.g., environmental conditions and/or tool conditions) that may affect whether desirable to output high energy radiation. Thus, as described above, the downhole control system may use check conditions to determine when output of high energy radiation is desirable based on factors, such as whether operation is authorized, determination of sub-surface characteristics is desired, and the sub-surface formation is sufficient to shield living beings at the surface.

Figure 5:
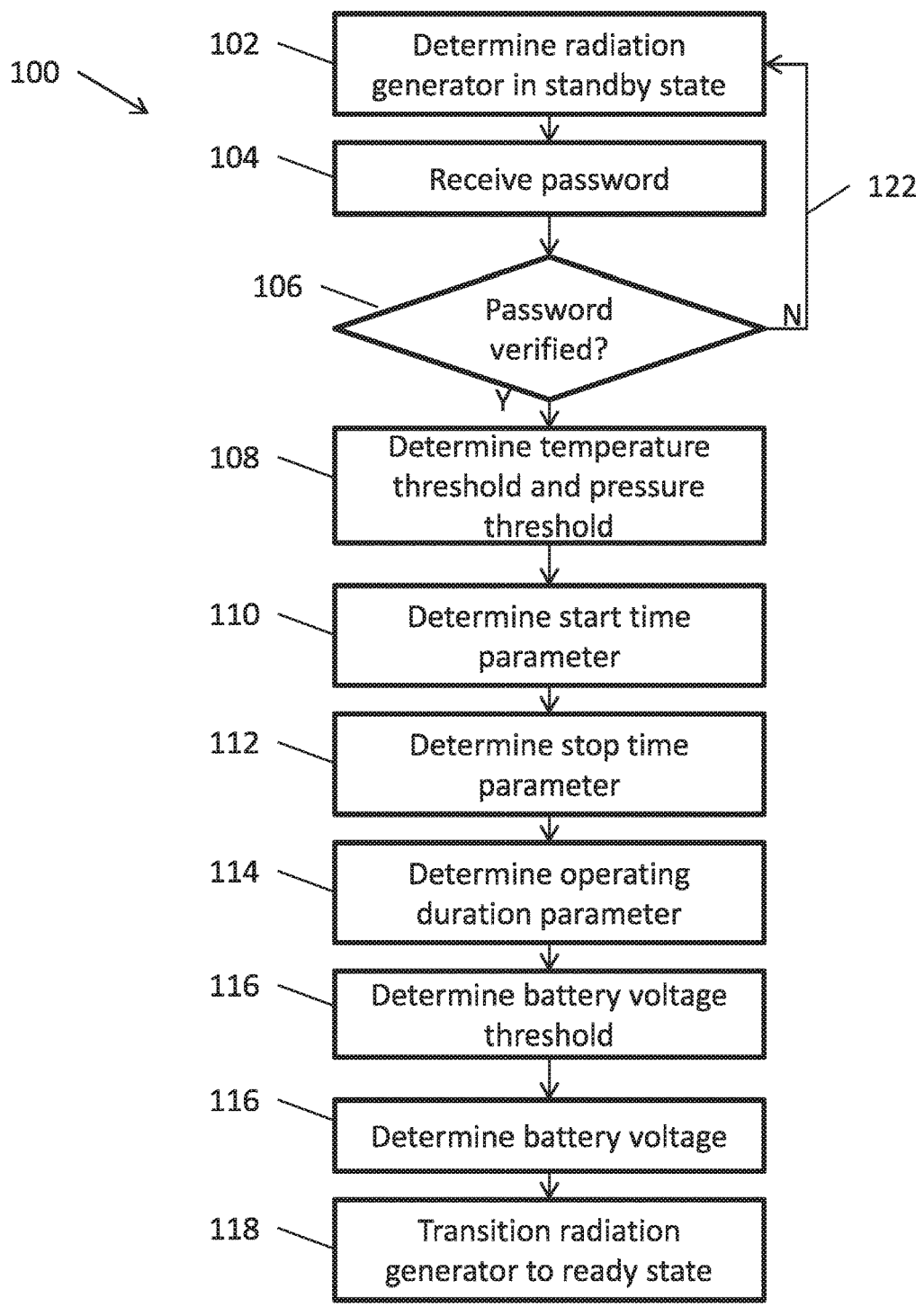
FIG. 5 is a flow diagram of a process for controlling operation of the electrically operated radiation generator of FIG. 3 when making the transition from a standby state to a radiation generator ready state, in accordance with an embodiment.

To help illustrate, one embodiment of a process 100 for controlling operation of an electrically operated radiation generator 40 in the standby state is described in FIG. 5. Generally, the process 100 includes determining that an electrically operated radiation generator is in a standby state (process block 102), receiving a password (process block 104), and determining whether the password is verified (decision block 106). When the password is verified, the process 100 includes determining a temperature threshold and a pressure threshold (process block 108), determining a start time parameter (process block 110), determining a stop time parameter (process block 112), and determining a operation duration parameters (process block 114), determining a battery voltage threshold (process block 116), and transitioning the electrically operated radiation generator to a ready state (process block 118). In some embodiment, the process 100 may be implemented by executing instructions stored in a tangible, non-transitory, computer-readable medium, such as memory 48 of the control system 44, using processing circuitry, such as the processor 46 of the control system 44.

Accordingly, the control system 44 may determine that the electrically operated radiation generator 40 is in the standby state (process block 102). In some embodiments, the downhole control system 44A may determine that the electrically operated radiation generator 40 is in the standby state when electrical power is not being supplied from the power supply 88 (e.g., battery 71) and each of the check conditions (e.g., the pressure threshold condition, the battery voltage threshold condition, the start time condition, the stop time condition, and/or the operating duration condition) has not yet been set.

Additionally, the control system 44 may receive a password (process block 104). In some embodiments, the password may be an alphanumeric password input to the surface control system 44B (e.g., by an operator). Once received, the control system 44 determine whether the password verification condition is met by determining whether the input password is associated with a user (e.g., operator) authorized to operate the electrically operated radiation generator 40 (decision block 106). In some embodiments, the control system 44 may verify the password by determining whether the password is on a list of passwords associated with authorized users. Additionally, in some embodiments, the surface control system 44B may verify the password and inform the downhole control system 44A that the password verification condition has been met (e.g., using tension pulses). In other embodiments, the surface control system 44B may transmit the password to the downhole control system 44A (e.g., using tension pulses) and the downhole control system 44A may verify the password.

After the password verification condition is met, the control system may determine operational parameters used for other check conditions. For example, the control system 44 may determine a temperature threshold and a pressure threshold condition based on a pressure threshold (process block 108). In some embodiments, the temperature threshold and/or the pressure threshold may be input to the surface control system 44B (e.g., by an operator) and the surface control system 44B may transmit the temperature threshold and/or pressure threshold to the downhole control system 44A (e.g., using tension pulses). The downhole control system 44A may then interpret and store the temperature threshold and/or pressure threshold in memory 48 for subsequent use, for example, when determining whether the temperature threshold condition and/or the pressure threshold condition are met.

As described above, temperature and pressure surrounding the downhole tool 62 may provide an indication of expected location of the downhole tool 62. Thus, in some embodiments, the pressure threshold and/or the temperature threshold may be set at conditions of a current surface 16 location. In such embodiments, a pressure and/or a temperature higher than the respective threshold may indicate that the downhole tool 62 is likely below the surface 16. On the other hand, a pressure and/or temperature lower than the respective threshold may indicate that the downhole tool 62 is likely at the surface 16.

Additionally, the control system 44 may determine the start time parameter (process block 110). As used herein, the "start time parameter" is intended to describe an absolute time after which the electrically operated radiation generator 40 can, but does not necessarily, begin outputting radiation. In some embodiments, the start time parameter may be input to the surface control system 44B (e.g., by an operator) and the surface control system 44B may communicate the start time parameter to the downhole control system 44A (e.g., using tension pulses). The downhole control system 44A may then interpret and store the start time parameter in memory 48 for subsequent use, for example, when determining whether the start time condition is met.

Furthermore, the control system 44 may determine the stop time parameter (process block 112). As used herein, the "stop time parameter" is intended to describe an absolute time at which the electrically operated radiation generator 40 must stop outputting radiation. In some embodiments, the stop time parameter may be input to the surface control system 44B (e.g., by an operator) and the surface control system 44B may communicate the stop time parameter to the downhole control system 44A (e.g., using tension pulses). The downhole control system 44A may then interpret and store the stop time parameter in memory 48 for subsequent use, for example, when determine whether the stop time condition is met.

The control system 44 may also determine the operating duration parameter (process block 114). As used herein, the "operating duration parameter" is intended to describe a relative time during which the electrically operated radiation generator 40 can, but does not necessarily, output radiation. In some embodiments, the operating duration parameter may be input to the surface control system 44B (e.g., by an operator) and the surface control system 44B may communicate the operating duration parameter to the downhole control system 44A (e.g., using tension pulses). The downhole control system 44A may then interpret and store the operating duration parameter in memory 48 for subsequent use, for example, when determining whether the operating duration condition is met.

Additionally, the control system 44 may determine the battery voltage threshold (process block 116). In some embodiments, the battery voltage threshold may be predetermined and stored in the downhole control system 44A before deploying downhole. In other embodiments, the battery voltage threshold may be input to the surface control system 44B (e.g., by an operator) and the surface control system 44B may communicate the battery voltage threshold to the downhole control system 44A (e.g., using tension pulses). The downhole control system 44A may then interpret and store the battery voltage threshold in memory 48 for subsequent use, for example, when determining whether the battery voltage threshold condition is met.

Generally, voltage of a battery 71 may decrease as amount of stored electrical energy decreases. Accordingly, the battery voltage threshold may be set to indicate whether the amount of electrical energy stored in the battery 71 is expected to be sufficient to power the electrically operated radiation generator 40 for an expected operating duration. Thus, in some embodiments, the battery voltage threshold may be set based at least in part on the operating duration parameter.

It should be appreciated that the operational parameters are described as being determined in a particular order merely to facilitate description. In other embodiments, the control system 44 may determine the operational parameters in any order and/or in parallel. Additionally, in other embodiments, the control system 44 may determine other operational parameters used to determine whether other check conditions are met.

Once one or more of the operational parameters to be used for check conditions are determined, the control system 44 may transition the electrically operated radiation generator 40 to the ready state (process block 118). In the ready state, the control system 44 may determine whether output of high energy radiation is desirable by determining whether each of the check conditions is met.

Figure 6:
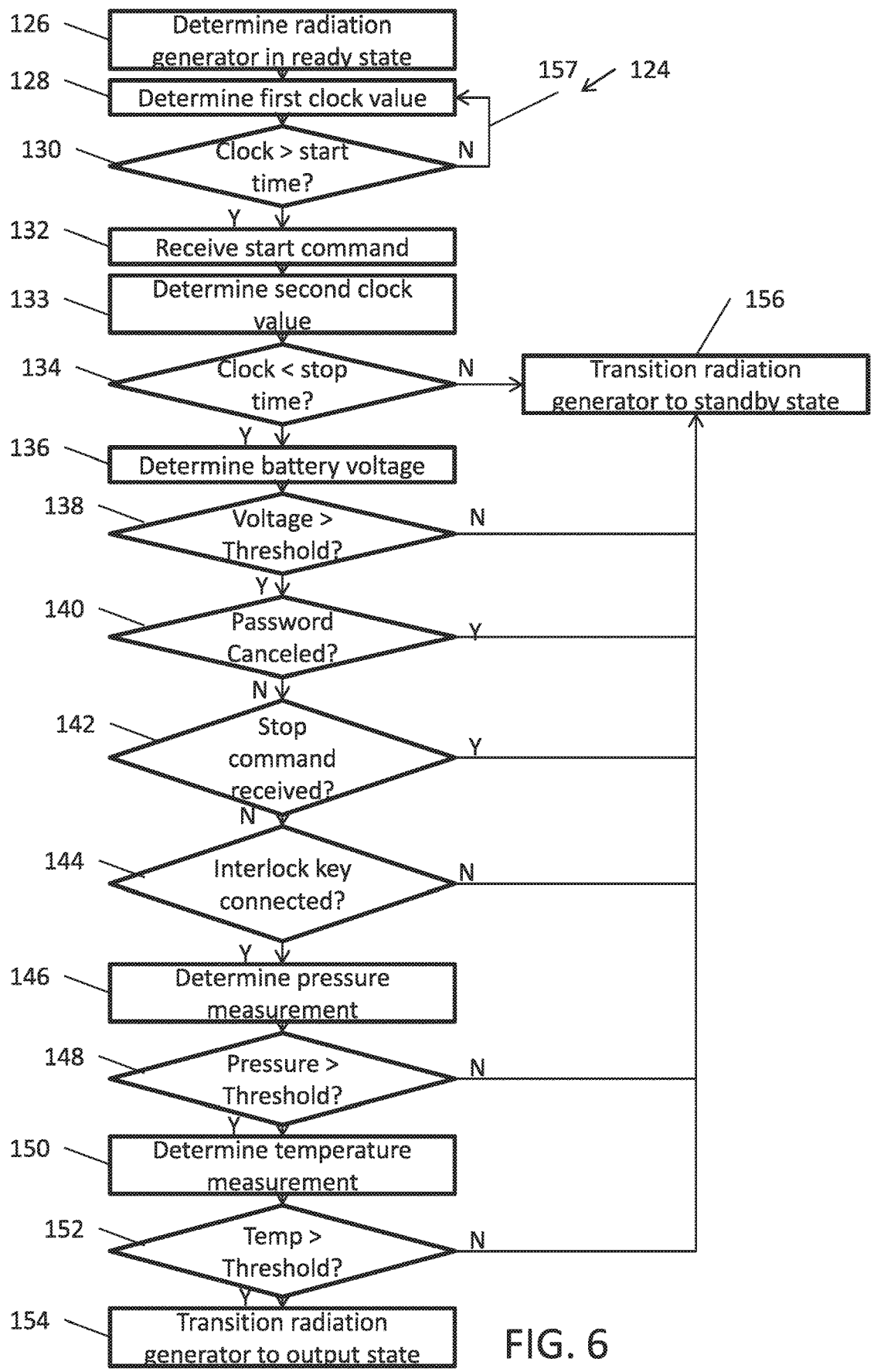
FIG. 6 is a flow diagram of a process for controlling operation of the electrically operated radiation generator of FIG. 3 when making the transition from a ready state to a radiation generator output state, in accordance with an embodiment.

To help illustrate, one embodiment of a process 124 for controlling operation of an electrically operated radiation generator 40 in the ready state is described in FIG. 6. Generally, the process 124 includes determining that an electrically operated radiation generator is in a ready state (process block 126), determining a first clock value (process block 128), determining whether the clock value is greater than a start time parameter (decision block 130), receiving a start command after the clock value is greater than the start time parameter (process block 132), determining a second clock value (process block 133), determining whether the clock value is less than a stop time parameter (decision block 134), determining voltage of a battery (process block 136), determining whether voltage of the battery is less than a threshold (decision block 138), determining whether a password is canceled (decision block 140), determining whether a stop command is received (decision block 142), determining whether an interlock key is connected (decision block 144), determining a pressure measurement (process block 146), determining whether the pressure measurement is greater than a threshold (decision block 148), determining a temperature measurement (process block 150), and determining whether the temperature measurement is greater than a threshold (decision block 152).

When the voltage is greater than the voltage threshold, the password has not been canceled, the stop command has not been received, the downhole interlock is connected, the pressure measurement is greater than the threshold, the temperature measurement is greater than the threshold, and the second clock value is less than the stop time parameter, the process 124 includes transitioning the electrically operated radiation generator 40 to an output state (process block 154) and, otherwise, transitioning the electrically operated radiation generator 40 to a standby state (process block 156). In some embodiment, the process 124 may be implemented by executing instructions stored in a tangible, non-transitory, computer-readable medium, such as memory 48 of the control system 44, using processing circuitry, such as the processor 46 of the control system 44.

Accordingly, the downhole control system 44A may determine that the electrically operated radiation generator 40 is in the ready state (process block 126). In some embodiments, the downhole control system 44A may determine that the electrically operated radiation generator 40 is the ready state when electrical power is not being supplied from the power supply 88 (e.g., battery 71) to the electrically operated radiation generator 40 and each of the operational parameters used for the check conditions has been determined.

As described above, in the ready state, the downhole control system 44A may determine whether check conditions are met. For example, the downhole control system 44A may determine whether the start time condition is met by determining the first clock value (process block 128) and determining whether the first clock value is greater than the start time parameter (decision block 130). In some embodiments, the downhole control system 44A may determine the clock value by polling the clock 72. Additionally, the downhole control system 44A may retrieve the start time parameter from memory 48 and compare it with the first clock value.

As described above, the start time parameter may be the earliest time that the electrically operated radiation generator can begin outputting radiation. Thus, when the clock value is not greater than the start time parameter, the downhole control system 44A determine that the start time condition it not yet met and periodically recheck if the first clock value is greater than the start time parameter (arrow 157).

Once the clock value becomes greater than the start time parameter, the downhole control system 44A may determine that the start time condition is met and determine whether a start command condition is met by determining whether a start command has been received (process block 132). In some embodiments, the start command may be input to the surface control system 44B (e.g., by an operator) to indicate that determination of a formation 12 property is desired. As such, the surface control system 44B may transmit the start command to the downhole control system 44A (e.g., using tension pulses).

Once the start command is received, the downhole control system 44A may determine that the start command condition is met and then determine whether other check conditions are met. For example, the downhole control system 44A may determine whether the stop time condition is met by determining a second clock value (process block 133) and determining whether the second clock value is less than the stop time parameter (decision block 134). In some embodiments, the downhole control system 44A determines the second block value by polling the clock 72. Additionally, the downhole control system 44A may retrieve the stop time parameter from memory 48 and compare it with the second clock value.

As described above, the stop time parameter may indicate time that the electrically operated radiation generator must cease outputting radiation. Thus, when the second clock is less than the stop time parameter, the downhole control system 44A may determine that the stop time parameter is met. On the other hand, when the second clock is not less than the stop time parameter, the downhole control system 44A may determine that the stop time parameter is not met and transition the electrically operated radiation generator 40 back to the standby state (process block 156).

Additionally, the downhole control system 44A may determine whether the battery voltage threshold condition is met by determining voltage of the battery 71 (process block 136) and determining whether the voltage of the battery 71 is greater than the battery voltage threshold (decision block 138). In some embodiments, the downhole control system 44A may determine the voltage of the battery 71 by polling a voltage sensor 42 connected to a terminal of the battery 71. Additionally, the downhole control system 44A may retrieve the battery voltage threshold from memory 48 and compare the voltage of the battery 71 to the battery voltage threshold.

As described above, the battery voltage threshold may indicate minimum amount of electrical energy stored to enable the battery 71 to power the electrically operated radiation generator 40. Thus, when the voltage of the battery 71 is greater than the battery voltage threshold, the downhole control system 44A may determine that the battery voltage threshold condition is met. On the other hand, when the voltage of the battery 71 is not greater than the battery voltage threshold, the downhole control system 44A may determine that the battery voltage threshold condition is not met and transition the electrically operated radiation generator 40 back to the standby state (process block 156).

The downhole control system 44A may also determine whether the interlock key verification condition is met by determining whether the interlock key is connected (decision block 144). In some embodiments, the interlock key may be a dedicated component that is selectively connected and disconnected from the conveyance line assembly 54. In some embodiments, the interlock key may be a resistor with a specific value. In such embodiments, the downhole control system 44A may determine whether an authorized interlock key is connected by using a sensor 42 to measure resistance across a slot for the interlock key.

In some embodiments, the interlock key may provide hardware authorization for operation of the electrically operated radiation generator 40. Thus, when an authorized interlock key is connected, the downhole control system 44A may determine that the interlock key verification condition is met. On the other hand, when an authorized interlock key is not connected, the downhole control system 44A may determine that the interlock key verification condition is not met and transition the electrically operated radiation generator 40 back to the standby state (process block 156).

Furthermore, the downhole control system 44A may determine whether the pressure threshold condition is met by determining the measured pressure of the surrounding environment (process block 146) and determining whether the measured pressure is greater than the pressure threshold (decision block 148). In some embodiments, the downhole control system 44A may determine the measured pressure by polling the pressure sensor 76. Additionally, the downhole control system 44A may retrieve the pressure threshold from memory 48 and compare the measured pressure to the pressure threshold.

As described above, the pressure threshold may be set at the pressure at or near the surface 16. In other words, measured pressure greater than the pressure threshold may indicate that the downhole tool 62 is likely downhole. Thus, when the measured pressure is greater than the pressure threshold, the downhole control system 44A may determine that the pressure threshold condition is met. On the other hand when the measured pressure is not greater than the pressure threshold, the downhole control system 44A may determine that the pressure threshold condition is not met and transition the electrically operated radiation generator 40 back to the standby state (process block 156).

The downhole control system 44A may also determine whether the temperature threshold condition is met by determining the measured temperature of the surrounding environment (process block 150) and determining whether the measured temperature is greater than the temperature threshold (decision block 152). In some embodiments, the downhole control system 44A may determine the measured temperature by polling the temperature sensor 74. Additionally, the downhole control system 44A may retrieve the temperature threshold from memory 48 and compare the measured temperature to the temperature threshold.

As described above, the temperature threshold may indicate temperature at or near the surface 16. In other words, measured temperature greater than the temperature threshold may indicate that the downhole tool 62 is likely downhole. Thus, when the measured temperature is greater than the temperature threshold, the downhole control system 44A may determine that the temperature threshold condition is met. On the other hand when the measured temperature is not greater than the temperature threshold, the downhole control system 44A may determine that the temperature threshold condition is not met and transition the electrically operated radiation generator 40 back to the standby state (process block 156).

In some embodiments, there may be more than one temperature sensor or more than one pressure sensor. In such embodiments, one may avoid the undesirable situation where a defective sensor causes a shutdown of the radiation generator. Instead of relying on the output of only one sensor, the decision may be based on whether a majority of the sensors indicate that the condition to generate radiation is met, or in a stricter scenario, whether more than a predetermined number of sensors indicate an undesired condition. In some embodiments, outputting radiation may not be allowed if more than one of the sensors (e.g. temperature or pressure sensors) is reading a value that is inconsistent with the readings of the remaining sensors. Additionally, the downhole control system 44A may determine whether the password verification condition is still met by determining whether the verified password has been canceled (decision block 140). In some embodiments, cancellation of the verified password may be input to the surface control system 44B (e.g., by an operator) and the surface control system 44B may transmit an indication of the cancellation to the downhole control system 44A (e.g., using tension pulses).

As described above, the password may be verified to provide software authorization to operate the electrically operated radiation generator 40. Thus, when the verified password has not been a canceled, the downhole control system 44A may determine that the password verification condition is still met. On the other hand, when the verified password has been canceled, the downhole control system 44A may determine that the password verification condition is no longer met and transition the electrically operated radiation generator 40 back to the standby state (process block 156).

The downhole control system 44A may also determine whether the stop command condition is met by determining whether a stop command has been received (decision block 142). In some embodiments, a stop command may be input to the surface control system 44B (e.g., by an operator) and surface control system 44B may transmit the stop command to the downhole control system 44A (e.g., using tension pulses). Generally, the stop command may be input to indicate that subsequent radiation output is not desired. Thus, when a stop command has not been received, the downhole control system 44A may determine that the stop command condition is met. On the other hand, when a stop command has been received, the downhole control system 44A may determine that the stop command condition is not met and transition the electrically operated radiation generator 40 back to the standby state (process block 156).

It should be appreciated that the downhole control system 44A is described as determine whether each of the check conditions in a particular order merely to facilitate description. In some embodiments, the downhole control system 44A may determine whether the check conditions are met in any order. In some embodiments, the downhole control system 44A may simultaneously determine whether a plurality of check conditions is met. Additionally, in other embodiments, the downhole control system 44A may determine whether other check conditions are met.

When each of the check conditions is met, the downhole control system 44A may transition the electrically operated radiation generator 40 to an output state (process block 154). Once in the output state, the downhole control system 44A may continue determining whether each of the check conditions continue to be met. When one or more check condition is no longer met, the downhole control system 44A may instruct the electrically operated radiation generator 40 to cease output of radiation.

Figure 7:
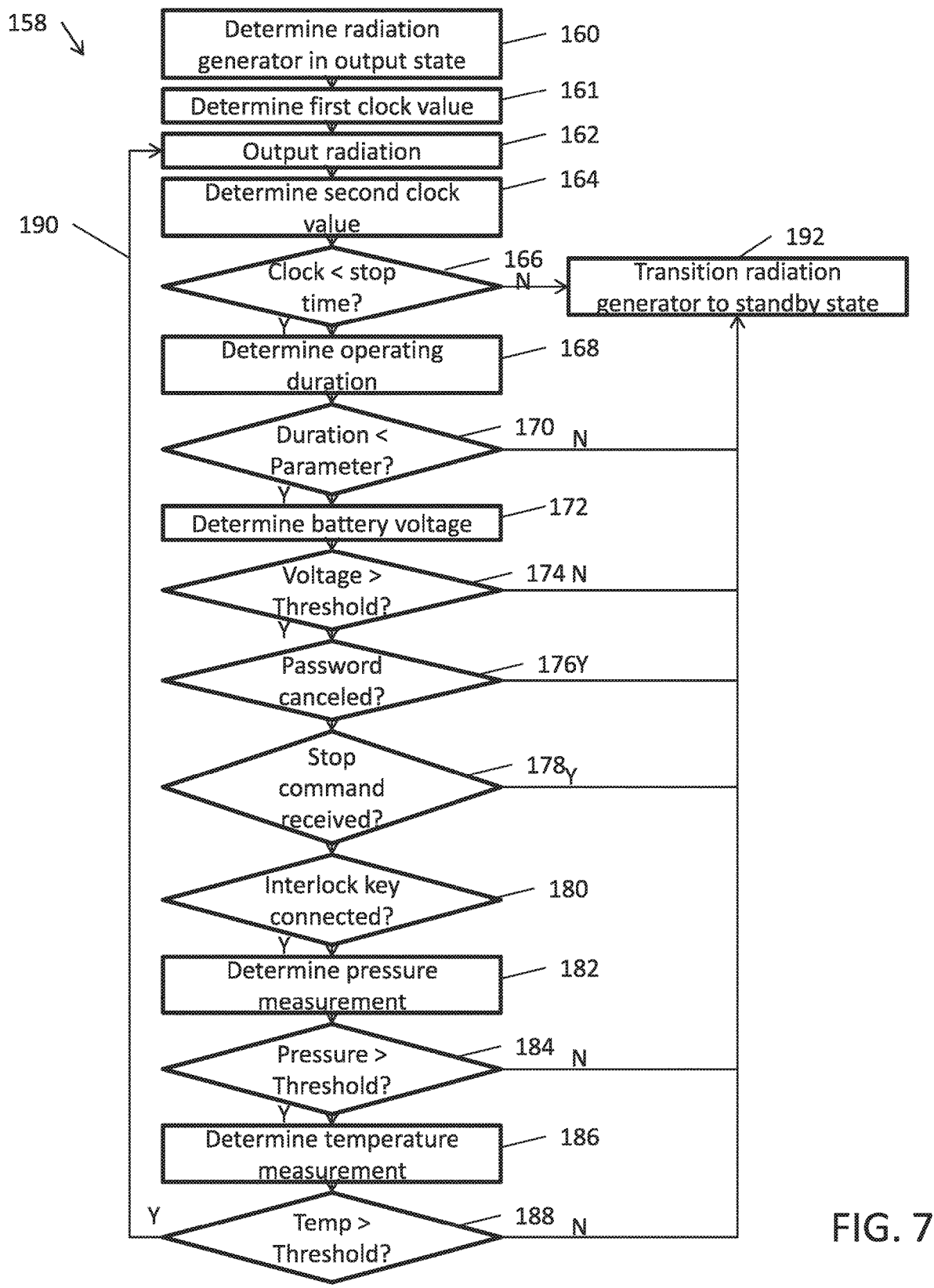
FIG. 7 is a flow diagram of a process for controlling operation of the electrically operated radiation generator of FIG. 3 when in an output state, in accordance with an embodiment.

To help illustrate, one embodiment of a process 158 for controlling operation of an electrically operated radiation generator 40 in the output state is described in FIG. 7. Generally, the process 158 includes determining that a electrically operated radiation generator is in an output state (process block 160), determining a first clock value (process block 161), instructing the electrically operated radiation generator to output radiation (process block 162), determining a second clock value (process block 164), determining whether the second clock value is less than a stop time parameter (decision block 166), determining an operating duration (process block 168), determining whether the operating duration is less than an operating duration threshold (decision block 170), determining voltage of a battery (process block 172), determining whether the voltage of the battery is greater than a threshold (decision block 174), determining whether a password is canceled (decision block 176), determining whether a stop command is received (decision block 178), determining whether an interlock key is connected (decision block 180), determining a pressure measurement (process block 182), determining whether the pressure measurement is greater than a threshold (decision block 184), determining a temperature measurement (process block 186), and determining whether the temperature measurement is greater than a threshold (decision block 188).

When the voltage is greater than the voltage threshold, the password has not been canceled, the stop command has not been received, the downhole interlock is connected, the pressure measurement is greater than the threshold, the temperature measurement is greater than the threshold, and the clock value is less than the stop time parameter, the process 158 includes maintaining the electrically operated radiation generator 40 in the output state (arrow 190) and, otherwise, transitioning the electrically operated radiation generator 40 to a standby state (process block 192). In some embodiment, the process 158 may be implemented by executing instructions stored in a tangible, non-transitory, computer-readable medium, such as memory 48 of the control system 44, using processing circuitry, such as the processor 46 of the control system 44.

Accordingly, the downhole control system 44A may determine that the electrically operated radiation generator 40 is in the output state (process block 160). When in the output state, the downhole control system 44A may instruct the electrically operated radiation generator 40 to output radiation by instructing the power supply 88 (e.g., battery 71) to supply electrical power to the electrically operated radiation generator 40 (process block 162). Thus, the downhole control system 44A may determine that the electrically operated radiation generator 40 is in the output state when electrical is supplied from the power supply to the electrically operated radiation generator 40 and/or when the output radiation monitor 64 detects radiation output from the electrically operated radiation generator 40.

Additionally, the downhole control system 44A may determine the first clock value when the electrically operated radiation generator 40 initially begins outputting radiation (process block 162). In this manner, the first clock value may indicate when the electrically operated radiation generator 40 is transitioned into the output state. In some embodiments, the downhole control system 44A may determine the first clock value by polling the clock 72.

As described above, in the output state, the downhole control system 44A may determine continuously and/or periodically determine whether check conditions continue to be met. For example, the downhole control system 44A may determine whether the operating duration condition is met by determining the second clock value (process block 164), determining an operating duration of the electrically operated radiation generator (process block 168) and determining whether the operating duration is less than the operating duration parameter (decision block 170). In some embodiments, the downhole control system 44A may determine the operating duration by determining difference between the first clock value and the second clock value. Additionally, downhole control system 44A may retrieve the operating duration parameter from memory 48 and compare it with the operating duration.

As described above, the operating duration parameter may indicate relative duration the electrically operated radiation generator 40 can operate. Thus, when the operating duration is less than the operating duration parameter, the downhole control system 44A may determine that the operating duration condition is met. On the other hand, when the operating duration is not less than the operating duration parameter, the downhole control system 44A may determine that the operating duration parameter is no longer met and transition the electrically operated radiation generator 40 back to the standby state by instructing the power supply 88 (e.g., battery 71) to stop supplying electrical power to the electrically operated radiation generator 40 (process block 192).

Similar to when in the ready state, the downhole control system 44A may also determine whether the stop time condition is met by determining whether the second clock value is less than the stop time parameter (decision block 166). Additionally, the downhole control system 44A may determine whether battery voltage threshold condition is met by determining whether the voltage of the battery 71 is greater than the battery voltage threshold (decision block 174) and determining whether the interlock key verification condition is met by determining whether an authorized interlock key is connected (decision block 180). Furthermore, the downhole control system 44A may determine whether the pressure threshold condition is met by determining whether the measured pressure is greater than the pressure threshold (decision block 184) and whether the temperature threshold condition is met by determining whether the measured temperature is greater than the temperature threshold (decision block 188). Moreover, the downhole control system 44A may determine whether check conditions on control commands are met by determining whether the verified password is canceled (decision block 176) and whether a stop command has been received (decision block 142).

When any of the check conditions is not met, the downhole control system 44A may transition the electrically operated radiation generator 40 back to the standby state by instructing the power supply 88 (e.g., battery 71) to stop supplying electrical power to the electrically operated radiation generator 40 (process block 192). On the other hand, when each of the check conditions is met, the downhole control system 44A may maintain the electrically operated radiation generator 40 in the output state to continue outputting radiation (arrow 190).

It should be appreciated that the downhole control system 44A is described as determining whether each of the check conditions in a particular order merely to facilitate description. In other embodiments, the downhole control system 44A may determine whether the check conditions are met in any order and/or in parallel. Additionally, in other embodiments, the downhole control system 44A may determine whether other check conditions are met.

In this manner, the techniques described herein enable the control system 44 to control operation of an electrically operated radiation generator 40 when operated downhole based at least in part on check conditions. Specifically, the check conditions may be set so that risk of exposing living beings to high energy radiation may be reduced when each of the check conditions is met. In fact, the techniques described herein enable the control system 44 to relatively independently control operation of the electrically operated radiation generator 40 even with limited communication capabilities with the surface 16.

In other embodiments, other techniques may be used to controlling operation of an electrically operated radiation generator 40 with limited capabilities with the surface. For example, a magnet switch inside the downhole tool 62 may be activated by bringing a strong magnet next to the downhole tool 62. This switch may short-circuit the battery 71 and force an internal fuse to disconnect, thereby disconnecting electrical power from the electrically operated radiation generator 40. Additionally, in some embodiments, the downhole tool 62 may record pressure gradient while going down and use this information to determine when it is going back uphole and automatically stop output of radiation from the electrically operated radiation generator 40. Furthermore, in some embodiments, the downhole tool 62 may include a pressure activated mechanical switch, which would turn the power to the radiation generator OFF, for example, below a certain pressure (e.g. 1 bar for tool-in-air conditions). In still further embodiments, the downhole tool 62 may include tool-in air detection and/or real-time depth detection.

Surface Operation

As described above, the control system 44 may also control operation of the electrically operated radiation generator 40 when operated on the surface. When operated sub-surface (e.g., downhole), surrounding formations 12 may absorb and, thus, shield living beings from high energy radiation. However, when operated on the surface, the electrically operated radiation generator 40 may instead by surrounded by air, which is much less capable of absorbing high energy radiation. Thus, risk of exposing living beings to high energy radiation may increase when operated on the surface.

As such, the control system 44 may utilize a surface operation tool to help manage the added risk of operating the electrically operated radiation generator 40 on the surface. In some embodiments, the surface operation tool may include visual and/or audio indicators to provide indications of operational parameters (e.g., operating state, radiation metric, and/or threshold values) of the electrically operated radiation generator. Additionally, in some embodiments, the surface operation tool may include input devices (e.g., buttons) to enable communication with the electrically operated radiation generator form the surface operation tool.

Figure 8:
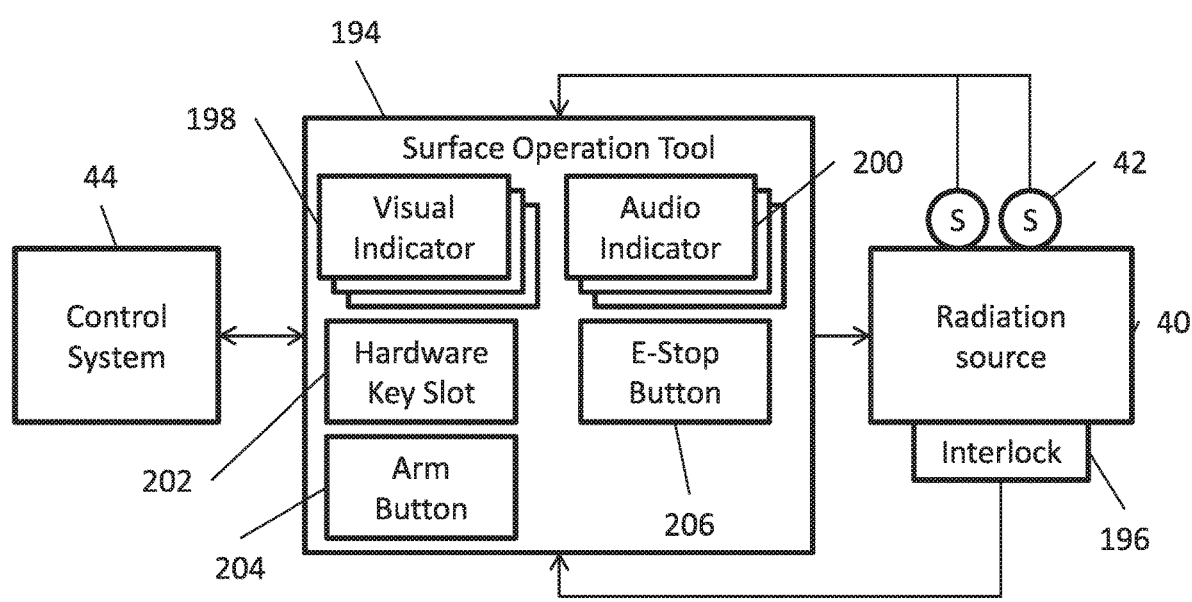
FIG. 8 is a block diagram of a surface operation tool used with the electrically operated radiation generator of FIG. 3, in accordance with an embodiment.

To help illustrate, one embodiment of a surface operation tool 194 used with the control system 44 and the electrically operated radiation generator 40 is described in FIG. 8. As in the depicted embodiment, the surface operation tool 194 may be communicatively coupled between the control system 44 and the radiation generator 40. In this manner, the surface operation tool 194 may receive information (e.g., control commands and/or operating state of the electrically operated radiation generator 40) from the control system 44. Additionally, the surface may transmit control commands to the electrically operated radiation generator 40.

Additionally, as in the depicted embodiment, the surface operation tool 194 may be communicatively coupled to one or more sensors 42. In some embodiments, a sensor 42 may be located in or proximate the electrically operated radiation parameter to measure a radiation metrics, such as a count (e.g., amount of output radiation) or a count rate (e.g., amount of output radiation per unit time), and/or environmental parameters, such as surrounding pressure or temperature. In this manner, the surface operation tool 194 may receive operational parameters from the one or more sensor 42.

Furthermore, as in the depicted embodiment, the surface operation tool 194 may be communicatively coupled to a barrier interlock 196. As described above, when operating on the surface 16, air may be insufficient to shield living beings from exposure to high energy radiation. Accordingly, in some embodiments, a radiation barrier may be formed around the perimeter of the electrically operated radiation generator 40 to shield living beings outside of the radiation barrier. To provide access to the electrically operated radiation generator 40, an opening (e.g., a door) may be included in the radiation barrier. Thus, the barrier interlock 196 may be located at the opening to monitor whether the opening is open or closed. In this manner, the surface operation tool 194 may receive status of the radiation barrier from the barrier interlock 196.

As described above, the surface operation tool 194 may provide visual indications of various parameters. Accordingly, the surface operation tool 194 may include one or more visual indicators 198, such as electronic displays or light bulbs. For example, when an electronic display, a visual indicator 198 may display an alphanumeric representation of the output radiation and/or operating state of the electrically operated radiation generator 40. When a light bulb, a visual indicator 198 may change colors and/or illuminate in different patterns to indicate an operating state of the electrically operated radiation generator 40.

Additionally, as described above, the surface operation tool 194 may provide audio indications of various operational parameters. Accordingly, the surface operation tool 194 may include one or more audio indicators 200, such as speakers. For example, when a speaker, an audio indicator 200 may output different sounds and/or different source patterns to indicate operating state and/or changes in operating state of the electrically operated radiation generator 40.

Furthermore, as described above, the surface operation tool 194 may provide input devices to enable user inputs (e.g., control commands) to the electrically operated radiation generator 40 from the surface operation tool 194. Accordingly, the surface operation tool 194 may include a hardware key slot 202, an emergency stop (E-stop) button 206, and an arm button 204. In some embodiments, a hardware key may be inserted into the key slot 202 and the surface operation tool 194 may determine whether operators associated with the inserted hardware key have authorization to operate the electrically operated radiation generator 40. Additionally, the surface operation tool 194 may transmit a stop command to the electrically operated radiation generator 40 when the emergency stop button 206 is actuated and may transmit a start command to the electrically operated radiation generator 40 when the arm button 204 is actuated.

In this manner, the control system 44 may use the surface operation tool 194 to facilitate controlling operation of the electrically operated radiation generator 40. Specifically, the surface operation tool 194 may reduce likelihood of exposing living beings to high energy radiation by providing quick access to the electrically operated radiation generator 40, for example, by enabling operators to determine operational parameters from the surface operation tool 194 and/or to input control commands to the electrically operated radiation generator from the surface operation tool 194. Additionally, as described above, the control system 44 may control operation of the electrically operated radiation generator 40 based on check conditions to reduce likelihood of exposing living beings to high energy radiation.

Figure 9:
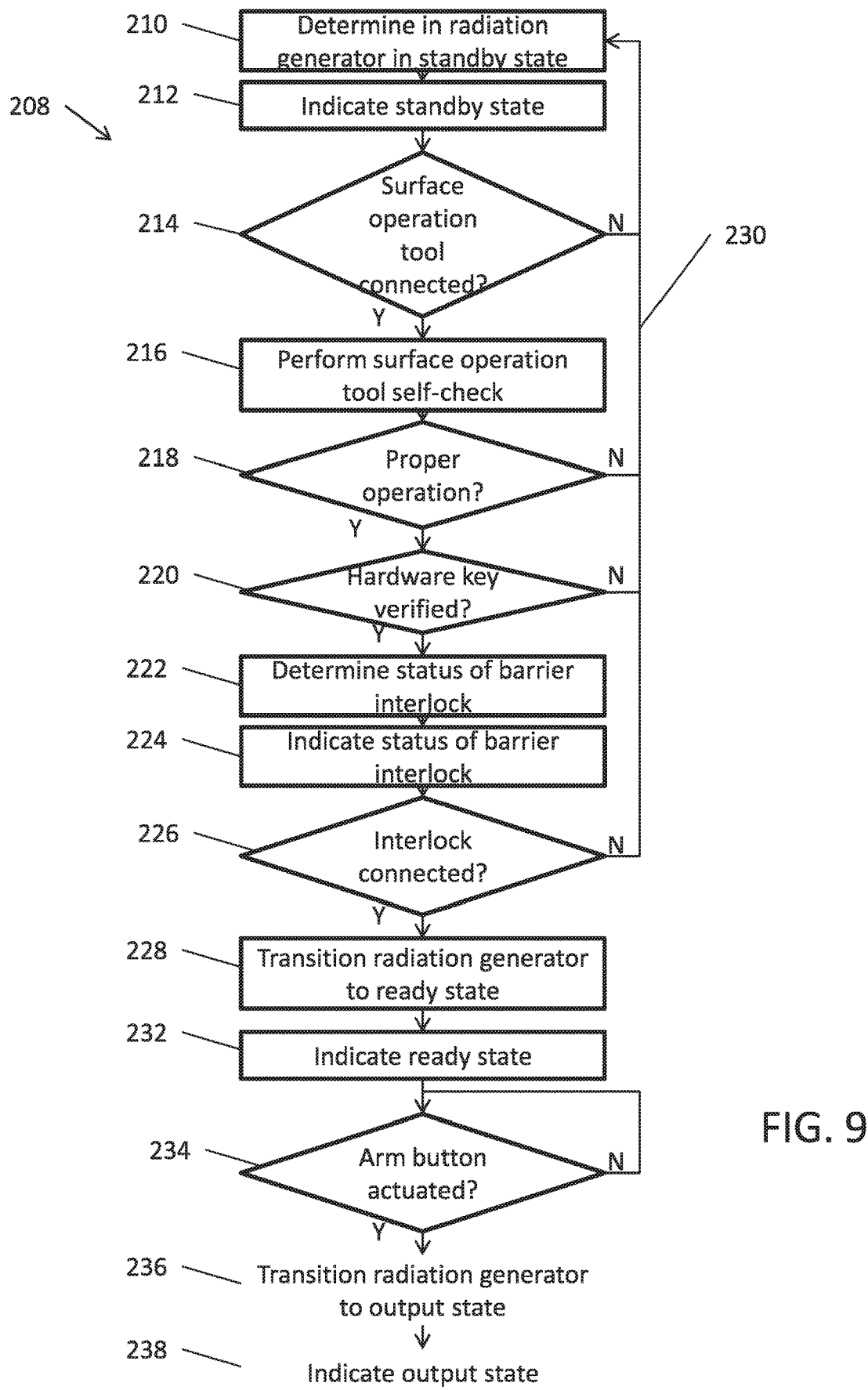
FIG. 9 is a flow diagram of a process for controlling operation of the electrically operated radiation generator of FIG. 3 using the surface operation tool of FIG. 8 when in a standby state and making the transition to output state, in accordance with an embodiment.

To help illustrate, one embodiment of a process 208 for controlling operation of an electrically operated radiation generator 40 when in the standby state is described in FIG. 9. Generally, the process 208 includes determining that a radiation generator is in a standby state (process block 210), indicating the standby state (process block 212), determining whether a surface operation tool is connected (decision block 214), performing a self-check on the surface operation tool (process block 216), determining whether the surface operation tool is operating properly (decision block 218), determining whether a hardware key is verified (decision block 220), determining status of a barrier interlock (process block 222), indicating status of the barrier interlock (process block 224), and determining whether the barrier interlock is connected (decision block 226).

When the surface operation tool is connected, the hardware key is verified, the surface operation tool is operating properly, and the barrier interlock is connected, the process 208 includes transitioning the electrically operated radiation generator to a ready state (process block 228) and, otherwise, maintaining the electrically operated radiation generator in the standby state (arrow 230). When in the ready state, the process 208 includes indicating the ready state (process block 232) and determining whether an arm button is actuated (decision block 234). When the arm button is actuated, the process 208 includes transitioning the electrically operated radiation generator to an output state (process block 236) and indicating the output state (process block 238). In some embodiment, the process 208 may be implemented by executing instructions stored in a tangible, non-transitory, computer-readable medium, such as memory 48 of the control system 44, using processing circuitry, such as the processor 46 of the control system 44.

Accordingly, the control system 44 may determine that the electrically operated radiation generator 40 is in the standby state (process block 210). In some embodiments, the downhole control system 44A may determine that the electrically operated radiation generator 40 is in the standby state when electrical power is not being supplied from the power supply 88 and each of the check conditions (e.g., the pressure threshold condition, the battery voltage threshold condition, the start time condition, the stop time condition, and/or the operating duration condition) has not yet been considered.

Additionally, the control system 44 may instruct the surface operation tool 194 to indicate that the electrically operated radiation generator 40 is in the standby state (process block 212). In some embodiments, the surface operation tool 194 may indicate the standby state using the visual indicators 198 and/or the audio indicators 200. For example, the surface operation tool 194 may indicate the standby state by turning a light bulb visual indicator 198 green and/or displaying an alphanumeric representation on an electronic display visual indicator 198.

In the standby state, the downhole control system 44A may determine whether check conditions are met. For example, the control system 44 may then determine whether the surface operation tool verification condition is met by determining whether the surface operation tool 194 is communicatively coupled between the control system 44 and the electrically operated radiation generator 40 (decision block 214), instructing the surface operation tool to perform a self-check (process block 216), and determining whether the surface operation tool is operating properly (decision block 218). In some embodiments, the surface operation tool 194 may be declared in the control system 44 (e.g., by an operator) and the control system 44 may determine whether the surface operation tool 194 is connected by determining whether signals are received. As described above, the surface operation tool 194 may facilitate surface operation by providing indications of various operational parameters and/or input devices. Accordingly, when the surface operation tool 194 is not connected, the control system 44 may determine that the surface operation tool verification condition is not met and maintain the electrically operated radiation generator 40 in the standby mode (arrow 230).

Additionally, in some embodiments, the surface operation tool 194 may perform the self-check by operating each of the visual indicators 198 and each of the audio indicators 200 to very that they are operating properly. When not operating properly, the control system 44 may determine that the surface operation tool verification condition is not met and maintain the electrically operated radiation generator 40 in the standby mode (arrow 230).

When the surface operation tool is connected and the operating properly, the control system 44 may determine that the surface operation tool verification condition is met and continue determining whether other check conditions are met. For example, the control system 44 may instruct the surface operation tool 194 to check whether the hardware key verification condition is met by determining whether a hardware key is inserted into the hardware key slot 202 is associated with an operator authorized to operate the electrically operated radiation generator 40 (decision block 220). In some embodiments, the surface operation tool 194 may read information (e.g., shape) from the hardware key and determining whether the information is on a list associated with authorized users.

In some embodiments, the hardware key may provide hardware authorization for operation of the electrically operated radiation generator 40. Thus, when an inserted hardware key is authorized, the control system 44 may determine that the hardware key verification condition is met. On the other hand, when an inserted hardware key is not authorized, the control system 44 may determine that the hardware key verification condition is not met and maintain the electrically operated radiation generator 40 in the standby mode (arrow 230). Each hardware key may additionally be associated with a specific password that needs to be entered in order to meet the hardware key condition.

Additionally, the control system 44 may determine whether the barrier interlock condition is met by determining status of the barrier interlock 196 (process block 222) and determining whether the barrier interlock is connected (decision block 226). In some embodiments, the barrier interlock 196 may form a circuit when connected. Thus, the control system 44 may determine whether connected by polling the barrier interlock 196 to determine whether the circuit has been formed.

As described above, the barrier interlock 196 may connected at the opening of a radiation barrier. In other words, the barrier interlock 196 may be disconnected when the radiation barrier is open and connected when the radiation barrier is closed. Thus, when connected, the control system 44 may determine that the barrier interlock condition is met. On the other hand, when not connected, the control system may determine that the barrier interlock condition is not met and maintain the electrically operated radiation generator 40 in the standby mode (arrow 230).

The control system 44 may also instruct the surface operation tool 194 to indicate status of the barrier interlock 196 (process block 224). In some embodiments, the surface operation tool 194 may indicate whether the barrier interlock 196 and, thus, the radiation barrier is open or closed by displaying an alphanumeric representation on an electronic display visual indicator 198.

It should be appreciated that the control system 44 is described as determine whether each of the check conditions in a particular order merely to facilitate description. In other embodiments, the control system 44 may determine whether the check conditions are met in any order and/or in parallel. Additionally, in other embodiments, the downhole control system 44A may determine whether other check conditions are met.

When each of the check conditions is met, the control system 44 may transition the electrically operated radiation generator 40 to the ready state (process block 228) and instruct the surface operation tool 194 to indicate that the electrically operated radiation generator 40 is in the ready state (process block 232). In some embodiments, the surface operation tool 194 may indicate the ready state using the visual indicators 198 and/or the audio indicators 200. For example, the surface operation tool 194 may indicate the ready state by turning a light bulb visual indicator 198 yellow and/or displaying an alphanumeric representation on an electronic display visual indicator 198.

Once in the ready state, the control system 44 may determine whether the arm button condition is met by determining whether the arm button 204 on the surface operation tool 194 has been actuated (decision block 234). As described above, the surface operation tool 194 may transmit a start command to the electrically operated radiation generator 40 when the arm button 204 is actuated. Thus, when actuated, the control system 44 may determine that the arm button condition is met and transition the electrically operated radiation generator 40 to the output state (process block 236). In some embodiments, the control system 44 may transition to the output state by instructing the power supply 88 to supply electrical power to the electrically operated radiation generator 40.

Additionally, the control system 44 may instruct the surface operation tool 194 to indicate that the electrically operated radiation generator 40 is in the output state (process block 238). In some embodiments, the surface operation tool 194 may indicate the output state using the visual indicators 198 and/or the audio indicators 200. For example, the surface operation tool 194 may indicate the output state by turning a light bulb visual indicator 198 red and outputting an audible alarm from a speaker audio indicator 200. Once in the output state, the control system 44 may continue determining whether check conditions are met and cease output of radiation when one or more check conditions is no longer met.

Figure 10:
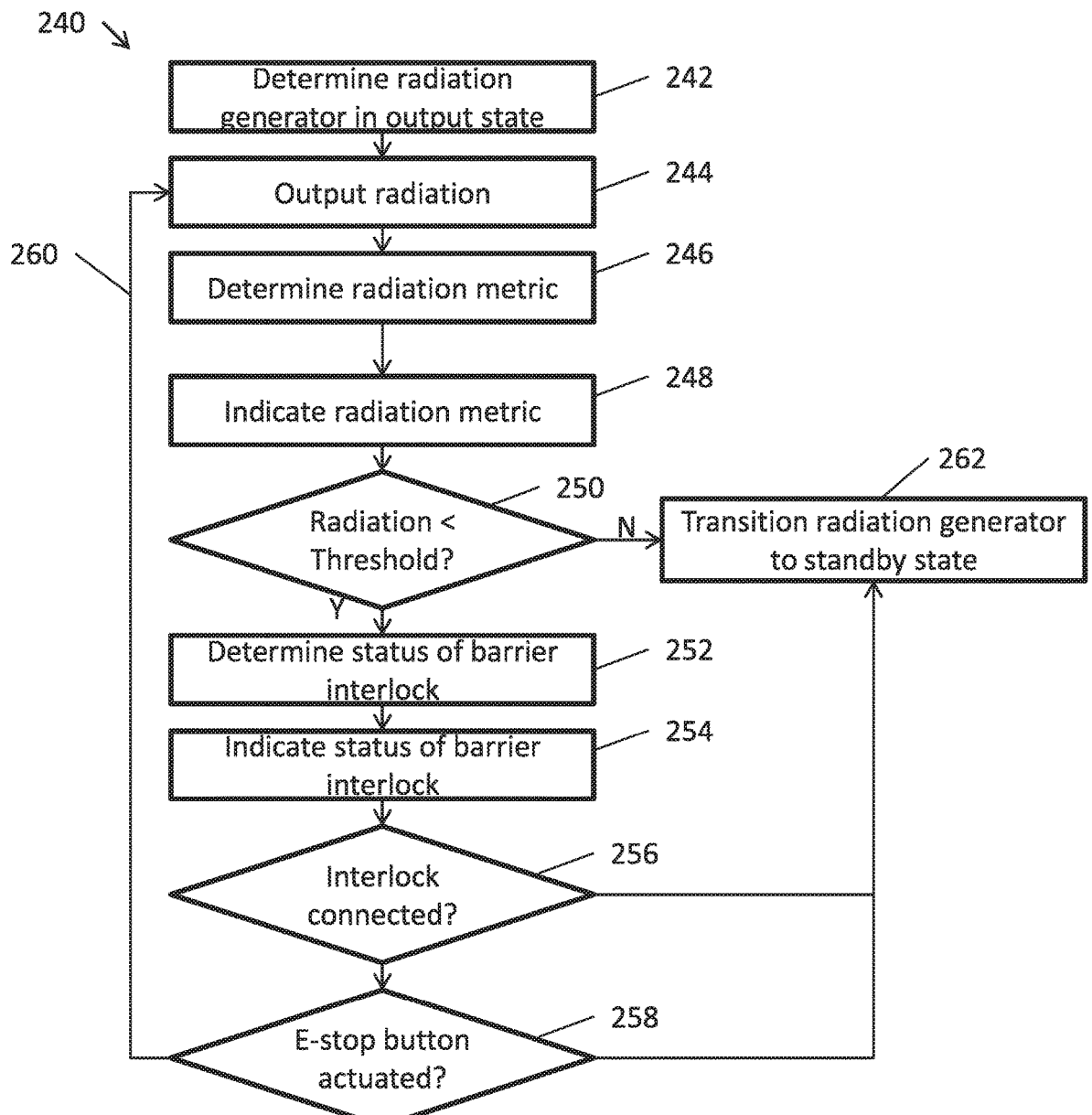
FIG. 10 is a flow diagram of a process for controlling operation of the electrically operated radiation generator of FIG. 3 using the surface operation tool of FIG. 8 when in an output state, in accordance with an embodiment.

To help illustrate, one embodiment of a process 240 for controlling operation of an electrically operated radiation generator 40 when in the output state is described in FIG. 10. Generally, the process 240 includes determining that a radiation generator is in an output state (process block 242), indicating the output state (process block 244), determining a radiation metric (process block 246), indicating the radiation metric (process block 248), determining whether the radiation metric is less than a threshold (decision block 250), determining status of a barrier interlock (process block 252), indicating status of the barrier interlock (process block 254), determining whether the barrier interlock is connected (decision block 256), and determining whether an emergency stop button is actuated (decision block 258).

When the radiation metric is less than the threshold, the barrier interlock is connected, and the emergency stop button is not actuated, the process 240 includes maintaining the electrically operated radiation generator in the output state (arrow 260) and, otherwise, transitioning the electrically operated radiation generator to a standby state (process block 262). In some embodiment, the process 240 may be implemented by executing instructions stored in a tangible, non-transitory, computer-readable medium, such as memory 48 of the control system 44, using processing circuitry, such as the processor 46 of the control system 44.

Accordingly, the control system 44 may determine that the electrically operated radiation generator 40 is in the output state (process block 242). When in the output state, the control system 44 may instruct the electrically operated radiation generator 40 to output radiation by instructing the power supply 88 to supply electrical power to the electrically operated radiation generator 40 (process block 244). Thus, the control system 44 may determine that the electrically operated radiation generator 40 is in the output state when electrical is supplied from the power supply to the electrically operated radiation generator 40 and/or when the output radiation monitor 64 detects radiation output from the electrically operated radiation generator 40.

As described above, in the output state, the control system 44 may determine continuously and/or periodically whether check conditions continue to be met. For example, the control system 44 may determine whether the radiation metric threshold condition is met by determining the radiation metric (process block 246) and determining whether the radiation metric is less than a threshold (decision block 250). In some embodiments, the radiation metric may provide an indication of radiation output from the electrically operated radiation generator 40. For example, in some embodiments, the radiation metric may be a total count (e.g., amount of radiation), a total count rate (e.g., amount of radiation per unit time), integrated charge, total energy deposited, count in an energy range, count rate in an energy range, count in a time window, count rate in a time window, count at a pulse height, count rate at a pulse height, ratio of counts above a discriminator level, ratio of count rates above a discriminator level, spectrum of counts as a function of energy, spectrum of count rates as a function of energy, spectrum of counts as a function of time, spectrum of count rates as a function of time, spectrum of counts as a function of pulse height, spectrum of count rate as a function of pulse height, spectral yield, or any combination thereof. Thus, in such embodiments, the control system 44 may determine the radiation metrics based at least in part on measurements determined by the sensors 42 (e.g., output radiation monitor 64). In some embodiments, the sensors 42 are gamma ray detectors, x-ray detectors, neutron detectors, that are capable of determining a count rate, a dose rate or an accumulate dose over certain time interval. Examples of such detectors include, but are not limited to, a Geiger Müller counter, a scintillation counter for gamma rays, or a Bonner ball for the detection of a neutron dose rate. Such a detector or detectors may be placed inside the radiation barrier to determine the radiation metric near the generator or outside of the radiation barrier where living beings are present. When the detector is placed inside the radiation barrier, if the radiation metric (e.g. a dose rate) is not exceeded, the radiation threshold condition may be met. When the detector is placed outside of the radiation barrier, a lower radiation threshold can be used to protect the surrounding environment, including living beings. If such threshold is not exceeded, the radiation threshold condition may be met.

In some embodiments, the radiation metric threshold may be set based at least in part on radiation rating of the radiation barrier. In other words, the radiation barrier may sufficiently block radiation resulting in a radiation metric less than the threshold from living beings outside the radiation barrier. On the other hand, the radiation barrier may be insufficient to block radiation resulting in a radiation metric greater than the threshold from living beings outside the radiation barrier. As such, when the radiation metric is less than the threshold, the control system 44 may determine that the radiation metric threshold condition is met. On the other hand, when the radiation metric is not less than the threshold, the control system 44 may determine that the radiation metric threshold condition is not met and transition the electrically operated radiation generator 40 back to the standby mode (process block 262), for example, by instructing the power supply 88 to stop supplying electrical power to the electrically operated radiation generator 40.

The control system 44 may also instruct the surface operation tool 194 to indicate the radiation metric and/or the radiation metric threshold (process block 248). In some embodiments, the surface operation tool 194 may indicate value of the radiation metric by displaying an alphanumeric representation on an electronic display visual indicator 198. Additionally, the surface operation tool 194 may indicate when value of the radiation metric is not less than the threshold by outputting an audible alarm from a speaker audio indicator 200.

Additionally, the control system 44 may determine whether the barrier interlock condition is met by determining status of the barrier interlock 196 (process block 252) and determining whether the barrier interlock is connected (decision block 226). In some embodiments, the barrier interlock 196 may form a circuit when connected. Thus, the control system 44 may determine whether connected by polling the barrier interlock 196 to determine whether the circuit has been formed.

As described above, the barrier interlock 196 may be connected at the opening of a radiation barrier. In other words, the barrier interlock 196 may be disconnected when the radiation barrier is open and connected when the radiation barrier is closed. Thus, when connected, the control system 44 may determine that the barrier interlock condition is met. On the other hand, when not connected, the control system may determine that the barrier interlock condition is not met and transition the electrically operated radiation generator 40 back to the standby mode (process block 262), for example, by instructing the power supply 88 to stop supplying electrical power to the electrically operated radiation generator 40.

The control system 44 may also instruct the surface operation tool 194 to indicate status of the barrier interlock 196 (process block 254). In some embodiments, the surface operation tool 194 may indicate whether the barrier interlock 196 and, thus, the radiation barrier is open or closed by displaying an alphanumeric representation on an electronic display visual indicator 198.

Furthermore, the control system 44 may determine whether the emergency stop button condition is met by determining whether the emergency stop button 206 on the surface operation tool 194 has been actuated (decision block 258). As described above, the surface operation tool 194 may transmit a stop command to the electrically operated radiation generator 40 when the emergency stop button 206 is actuated. Thus, when not actuated, the control system 44 may determine that the emergency stop button condition is met. On the other hand, when not actuated, the control system 44 may determine that the emergency stop button condition is not met and transition the electrically operated radiation generator 40 back to the standby mode (process block 262), for example, by instructing the power supply 88 to stop supplying electrical power to the electrically operated radiation generator 40. In some embodiments, the control system 44 may be configured in a way such that if the radiation generator 40 does not receive a command from the control system 44 for a predetermined period of time, it will revert to standby mode. This provides an additional mechanism of protection for the events such as when the control system 44 somehow becomes unresponsive (e.g. due to a processor lock up) or the connection to the radiation generator 40 becomes locked up. In some embodiments, the emergency stop button may directly interrupt the power to the radiation generator.

When each of the check conditions is met, the control system 44 may maintain the electrically operated radiation generator 40 in the output state to continue outputting radiation (arrow 260). It should be appreciated that the check conditions are presented in a particular order merely to facilitate description. In other embodiments, the control system 44 may determine whether the check orders are met in any order and/or in parallel. Additionally, in other embodiments, the control system 44 may determine whether other check conditions are met.

In this manner, the techniques described herein enable the control system 44 to control operation of an electrically operated radiation generator 40 when operated on the surface 16 based at least in part on check conditions. Specifically, the check conditions may be set so that risk of exposing living beings to high energy radiation may be reduced when each of the check conditions is met.

As such, the technical effects of the present disclosure include improving control over operation of an electrically operated radiation generator to reduce amount and/or likelihood of exposing living beings to output radiation. In some embodiments, a control system may use various check conditions to determine whether output of high energy radiation is desirable. For example, when operating downhole, the control system may check whether a start parameter is reached, an operating parameter is reached, a stop time parameter is reach, battery voltage is above a threshold, a password is verified, a stop command is received, a start command is receive, an interlock key is connected, a pressure measurement is above a threshold, and/or a temperature measurement is above a threshold. Additionally, when operating on the surface, the control system may check whether a surface operation tool is connected, the surface operation tool is operating properly, a hardware key is verified, a barrier interlock is connected, an arm button is actuated, an emergency stop button is actuated, and/or a radiation metric is less than a threshold.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

What is claimed is:

1. A downhole tool, comprising:
an electrically operated radiation generator configured to selectively output radiation to a surrounding environment based at least in part on supply of electrical power; and
a control system configured to:
determine likelihood of exposing living beings in the surrounding environment to output radiation by determining whether one or more check conditions is met;
instruct the electrically operated radiation generator to output radiation after each of the one or more check conditions is met; and instruct the electrically operated radiation generator to cease output of radiation when at least one of the one or more check conditions is no longer met;

wherein the control system allows operation of the tool at the surface only upon determining that a hardware key verification condition is met and a barrier interlock condition is met, wherein the hardware key verification condition is met when an inserted hardware is verified as associated with an authorized user, and the barrier interlock condition is met when a barrier interlock at an opening in a radiation barrier connected with electrically operated radiation generator is in a closed position;

wherein the one or more check conditions for operation comprise:

an interlock key condition, wherein the interlock key condition is met if an authorized interlock key is connected to the downhole tool;

a start time condition based at least in part on whether a clock value is greater than a start time parameter; and a stop time condition based at least in part on whether the clock value is less than a stop time parameter.

2. The downhole tool of claim 1, wherein the control system comprises a downhole control system located in the downhole tool, wherein the downhole control system is configured to:

determine whether the start time condition is met;

determine whether an operating duration condition is met based at least in part on whether a duration that radiation is output from the electrically operated radiation generator is less than an operating duration parameter;

determine whether a battery voltage threshold condition is met based at least in part on whether a voltage of a battery configured to supply the electrical power to the electrically operated radiation generator is greater than a battery voltage threshold; and determine whether a password verification condition is met based at least in part on whether a password input to the control system is associated with an operator authorized to operate the electrically operated radiation generator.

3. The downhole tool of claim 2, wherein the downhole control system is configured to:

instruct the electrically operated radiation generator to output radiation after the start time condition, the stop time condition, the battery voltage threshold condition, the password verification condition, the interlock key condition; and instruct the electrically operated radiation generator to cease output of radiation after the stop time condition, the operating duration condition, the battery voltage threshold condition, the password verification condition, the interlock key condition, or any combination thereof is no longer met.

4. The downhole tool of claim 2, wherein the downhole control system is configured to receive the start time parameter, the stop time parameter, the operating duration parameter, the battery voltage threshold, the password, or any combination thereof from a surface control system of the control system.

5. The downhole tool of claim 4, wherein the downhole control system is configured to receive from the surface control system via tension pulses on a conveyance line coupled between the downhole tool and a surface.

6. The downhole tool of claim 1, wherein:

the downhole tool comprises a slick line tool; and the electrically operated radiation generator comprises an x-ray generator, a neutron generator, or a gamma ray generator.

7. The downhole tool of claim 1, wherein the one or more check conditions comprise an operating duration condition based at least in part on whether a duration that radiation is output from the electrically operated radiation generator is less than an operating duration parameter.

8. The downhole tool of claim 1, wherein the one or more check conditions comprise:

a start command condition, wherein the start command condition is met if a start command is received from a surface control system; and a stop command condition, wherein the stop command condition is met if a stop command is received from the surface control system.

9. The downhole tool of claim 1, wherein the one or more check conditions comprise a battery voltage threshold condition based at least in part on whether a voltage of a battery, configured to supply electrical power to the electrically operated radiation generator, is greater than a battery voltage threshold.

10. The downhole tool of claim 1, wherein the start time parameter and the stop time parameter form a time window between the start time parameter and the stop time parameter, wherein the start time condition is met and the stop time parameter is met in response to the clock value within the time window.

11. The downhole tool of claim 1, comprising a power source configured to travel into a borehole and provide power to the electrically operated radiation generator.

12. The downhole tool of claim 11, wherein the power source comprises a battery.

13. A surface operation tool, comprising one or more indicators and one or more input devices, wherein the one or more indicators are configured to provide an indication of operational parameters of an electrically operated radiation generator, and wherein the one or more input devices are configured to enable inputting of control commands to the electrically operated radiation generator;

wherein the surface operation tool is configured to control activation of the electrically operated radiation generator during surface operations, wherein to control activation of the electrically operated radiation generator during surface operations, the surface operation tool is configured to:

determine whether a surface operation tool verification condition is met based at least in part on whether the surface operation tool is communicatively coupled to the electrically operated radiation generator and whether the one or more indicators are operating properly;

determine whether a barrier interlock condition is met based at least in part on whether an opening of a radiation barrier connected with the electrically operated radiation generator is in a closed position; and determine whether a radiation metric threshold condition is met based at least in part on whether a radiation metric is less than a radiation metric threshold.

14. The surface operation tool of claim 13, wherein the surface operation tool is configured to:

instruct the electrically operated radiation generator to output radiation after the surface operation tool verification condition and the barrier interlock condition; and instruct the electrically operated radiation generator to stop output of radiation after the radiation metric threshold condition, the barrier interlock condition, or any combination thereof is no longer met.

15. The surface operation tool of claim 13, wherein the one or more indicators comprise an electronic display, a light bulb, a speaker, or any combination thereof.

16. The surface operation tool of claim 13, wherein to control activation of the electrically operated radiation generator during surface operations, the surface operation tool is configured to:

determine whether a hardware key condition is met based at least in part on whether a hardware key input to the one or more input devices is associated with an operator authorized to operate the electrically operated radiation generator;

determine whether an arm button condition is met based at least in part on whether an arm button on the surface operation tool is actuated; and determine whether an emergency stop button condition is met based at least in part on whether an emergency stop button on the surface operation tool is actuated.

17. The surface operation tool of claim 13, wherein to control activation of the electrically operated radiation generator during surface operations, the surface operation tool is configured to:

determine whether the barrier interlock condition is met based at least in part on whether the barrier interlock located at the opening of the radiation barrier is connected; and determine whether the radiation metric threshold condition is met based at least in part on whether the radiation metric is less than the radiation metric threshold.

* * * * *